US012614207B2

(12) United States Patent
Riviello et al.

(10) Patent No.: US 12,614,207 B2
(45) Date of Patent: Apr. 28, 2026

(54) UPDATING A DISPLAY SCREEN

(71) Applicant: Comcast Cable Communications, LLC, Philadelphia, PA (US)

(72) Inventors: John Riviello, Mount Laurel, NJ (US); Trevor Menagh, Seattle, WA (US); Eric Schrag, Wilmington, DE (US); Michael Bevilacqua-Linn, Philadelphia, PA (US); Peter Cline, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 703 days.

(21) Appl. No.: 15/019,522

(22) Filed: Feb. 9, 2016

(65) Prior Publication Data

US 2017/0228762 A1 Aug. 10, 2017

(51) Int. Cl.
| | |
|---|---|
| *G06Q 30/00* | (2023.01) |
| *G06Q 30/0241* | (2023.01) |
| *G06Q 30/0242* | (2023.01) |
| *G06Q 30/0273* | (2023.01) |

(52) U.S. Cl.
CPC ..... *G06Q 30/0243* (2013.01); *G06Q 30/0273* (2013.01); *G06Q 30/0277* (2013.01)

(58) Field of Classification Search
CPC ........... G06Q 30/0277; G06Q 30/0269; G06Q 30/02; G06Q 30/0243; G06Q 30/0273
See application file for complete search history.

(56) References Cited

U.S. PATENT DOCUMENTS

| | | | |
|---|---|---|---|
| 6,621,524 B1 * | 9/2003 | Iijima .................... | H04N 5/262 |
| | | | 348/584 |
| 8,190,474 B2 | 5/2012 | Lerman et al. | |
| 8,306,859 B2 | 11/2012 | Lerman et al. | |
| 10,084,557 B2 | 9/2018 | Monnerat et al. | |
| 2002/0063727 A1 | 5/2002 | Markel | |
| 2002/0087403 A1 | 7/2002 | Meyers et al. | |
| 2006/0111970 A1 * | 5/2006 | Hill ........................ | G06Q 30/02 |
| | | | 705/14.69 |
| 2006/0271877 A1 | 11/2006 | Theurer | |
| 2007/0162428 A1 * | 7/2007 | Williams ................ | G06F 16/44 |
| 2007/0217130 A1 | 9/2007 | Eri | |
| 2009/0077579 A1 | 3/2009 | Li et al. | |

(Continued)

OTHER PUBLICATIONS

Johnston; Strategic Online Advertising_ Modeling . . . net User Behavior with Advertising; SIEDS; pp. 162-167; 2006.*

(Continued)

*Primary Examiner* — Radu Andrei
(74) *Attorney, Agent, or Firm* — Banner & Witcoff, Ltd.

(57) ABSTRACT

Methods, systems, computer-readable media, and apparatuses for providing responsive advertisements are described herein. In some embodiments, a computing device may send a presentation including multiple advertisements to a user device. The computing device may receive an indication that an advertisement has been overlaid by a window and may, in response, determine to resize or relocation the advertisement. The computing device may determine impression credit for the advertisement based on a display duration for the advertisement prior to being overlaid by the window and a display duration for the resized or relocated advertisement while not being overlaid by any window.

18 Claims, 10 Drawing Sheets

(56)          References Cited

U.S. PATENT DOCUMENTS

| | | | |
|---|---|---|---|
| 2009/0193355 A1 | 7/2009 | Tada | |
| 2010/0005403 A1 | 1/2010 | Rozmaryn et al. | |
| 2010/0131355 A1* | 5/2010 | Kitchen | A63F 13/30 |
| | | | 705/14.43 |
| 2011/0035274 A1* | 2/2011 | Goel | G06Q 30/04 |
| | | | 705/14.69 |
| 2011/0113354 A1 | 5/2011 | Thiyagarajan et al. | |
| 2011/0145856 A1 | 6/2011 | Agarwal et al. | |
| 2012/0032979 A1* | 2/2012 | Blow | G06F 1/1626 |
| | | | 345/173 |
| 2012/0272258 A1* | 10/2012 | Bedi | H04N 21/4316 |
| | | | 725/14 |
| 2013/0018731 A1 | 1/2013 | Morris et al. | |
| 2013/0185164 A1* | 7/2013 | Pottjegort | G06Q 30/02 |
| | | | 705/14.73 |
| 2013/0347018 A1 | 12/2013 | Limp et al. | |
| 2014/0078402 A1 | 3/2014 | Weast | |
| 2014/0139742 A1 | 5/2014 | Krishna et al. | |
| 2014/0181634 A1* | 6/2014 | Compain | G06F 40/166 |
| | | | 715/234 |
| 2015/0199708 A1* | 7/2015 | Ying | G06Q 30/0241 |
| | | | 705/14.4 |
| 2016/0180512 A1* | 6/2016 | Myers | G06T 11/00 |
| | | | 345/419 |
| 2017/0228762 A1 | 8/2017 | Riviello et al. | |
| 2018/0114175 A1* | 4/2018 | Fei | G06F 16/215 |

OTHER PUBLICATIONS

Wuang; Scheduling of television commercials; IEEE, Huafan University; 5 pages; 2010.*

U.S. Appl. No. 16/106,207, Advertisement Tracking, filed Apr. 8, 2019.

* cited by examiner

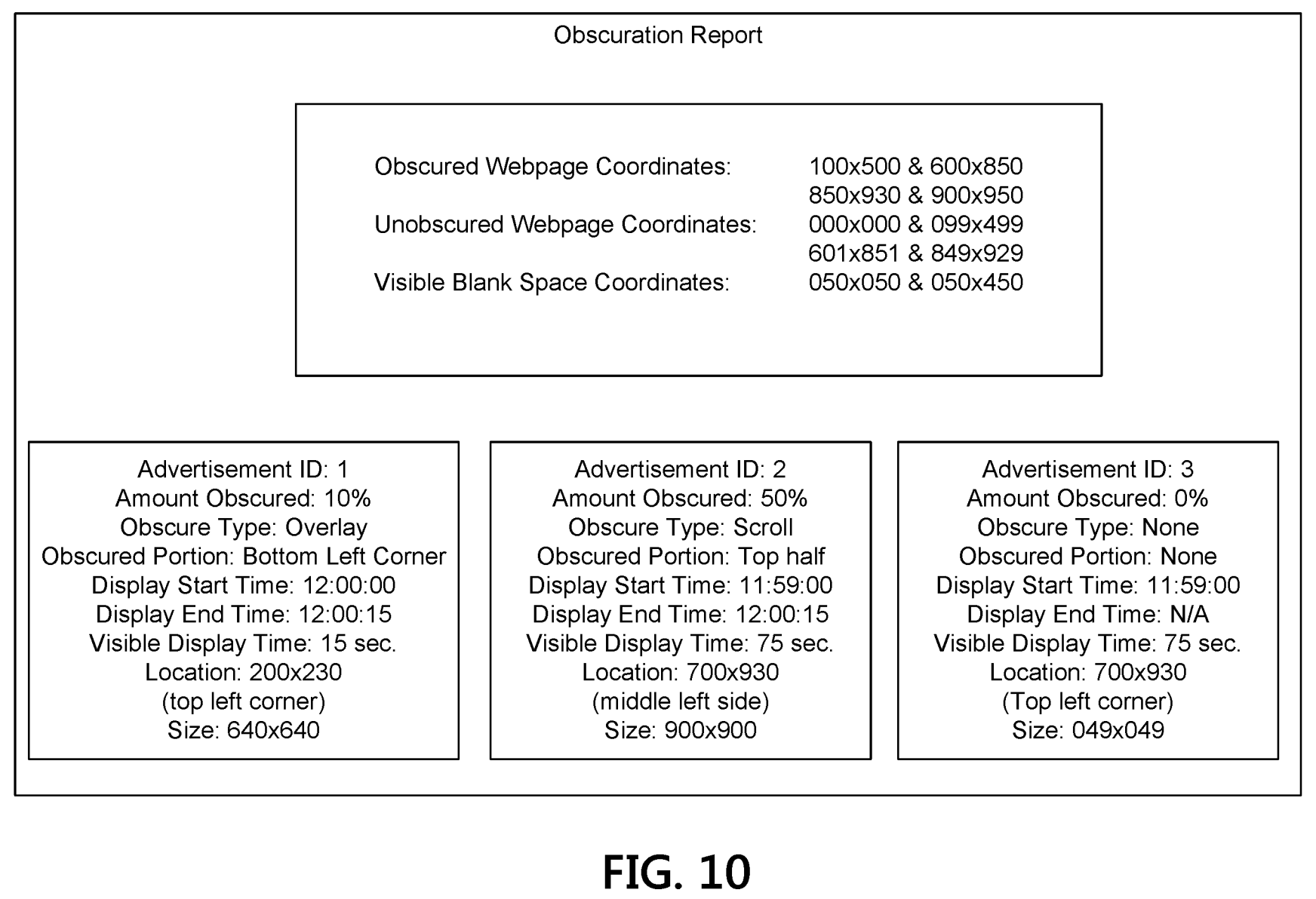

Obscuration Report

Obscured Webpage Coordinates:        100x500 & 600x850
                                     850x930 & 900x950
Unobscured Webpage Coordinates:      000x000 & 099x499
                                     601x851 & 849x929
Visible Blank Space Coordinates:     050x050 & 050x450

Advertisement ID: 3
Amount Obscured: 0%
Obscure Type: None
Obscured Portion: None
Display Start Time: 11:59:00
Display End Time: N/A
Visible Display Time: 75 sec.
Location: 700x930
(Top left corner)
Size: 049x049

Advertisement ID: 2
Amount Obscured: 50%
Obscure Type: Scroll
Obscured Portion: Top half
Display Start Time: 11:59:00
Display End Time: 12:00:15
Visible Display Time: 75 sec.
Location: 700x930
(middle left side)
Size: 900x900

Advertisement ID: 1
Amount Obscured: 10%
Obscure Type: Overlay
Obscured Portion: Bottom Left Corner
Display Start Time: 12:00:00
Display End Time: 12:00:15
Visible Display Time: 15 sec.
Location: 200x230
(top left corner)
Size: 640x640

FIG. 10

UPDATING A DISPLAY SCREEN

BACKGROUND

Today, many advertisements for goods and/or services are displayed on webpages visited by users and prospective customers. Often, the value of an advertisement is dependent upon how long the advertisement is displayed on a webpage. In today's multitasking world, however, it may be inaccurate to assume that a user has actually seen an advertisement or that an advertisement has been displayed as intended on a webpage that the user is visiting. Thus, there is an ever-present need for alternative and more accurate ways to present and measure an advertisement's effectiveness when presented to a user.

SUMMARY

Various features described herein provide help to account for advertisements that may be part of a webpage that a viewer is browsing, but which happens to be not visible due to it being scrolled off-screen and/or overlaid by another window on the viewer's desktop. For example, various features described herein may adjust a presentation containing an advertisement, where the presentation may be a webpage or any other form of content. The presentation may be adjusted (e.g., reposition advertisements, resize advertisements, etc.) to maximize how long the advertisements on the webpage are actually visible to its viewer. Additionally, various features described herein provide ways to more accurately determine how long the advertisements are displayed in a manner actually visible to the viewer. In particular, in one or more embodiments discussed in further detail below, advertisement management functionalities are implemented, and/or used in a number of different ways to provide one or more of these and/or other advantages.

In some embodiments, a computing device may determine when a viewer has scrolled a presentation (e.g., a webpage in a browser) such that an advertisement is no longer visible on the screen, and the computing device may respond to this by adjusting the impression credit for the advertisement, moving the advertisement to a different part of the webpage that is still visible, resizing the advertisement such that the advertisement is still visible, etc. In some embodiments, when an advertisement is scrolled to the edge of the screen or browser window, the computing device may prevent the advertisement from scrolling any farther in that direction, so that the advertisement remains at the edge of the screen or window. In some embodiments, a computing device may determine when another object or window is overlaid on top of an advertisement on a webpage thereby blocking the underlying advertisement from being viewed by the user. The computing device may respond by adjusting the impression credit for the advertisement, moving the advertisement to a different part of the webpage that is still visible, or resize or reformat the advertisement such that the advertisement is still visible, etc. By resizing and/or repositioning advertisements on the webpage to areas visible by the viewer, the advertisements may continue to be exposed to the viewer.

In some embodiments, each of the advertisements may be associated with a priority level. As visible areas of the webpage becomes constrained such that not all of the advertisements may be visible to the viewer, a computing device may, using a comparison of the priority levels of the advertisements, determine what advertisements are to be removed and replaced with other advertisements. As a result, advertisements with a higher priority level may remain on the visible area of the webpage so that impression credit (discussed below) for the advertisement may be obtained. The computing device may also determine, using the comparison of the priority levels of the advertisements and advertiser preferences, the size and position of each of the advertisements that remain on the presentation (e.g., webpage). In some embodiments, the priority level of a removed advertisement may be increased so that the advertisement may remain on a webpage when the advertisement is later displayed to the viewer and a similar circumstance occurs. In some embodiments, the priority level of an advertisement may be lowered when impression credit has already been obtained for the advertisement.

In some embodiments, impression credit may be a basis by which advertisers are charged and/or otherwise billed for their advertisements being displayed to the viewer of the webpage. In such embodiments, impression credit may be based on how long an advertisement on the webpage is actually visible to its viewer rather than based on how long the webpage is displayed irrespective of whether the webpage or the advertisement is visible to the viewer. For example, impression credit may not be obtained and/or otherwise granted for an advertisement that might not be visible on the webpage because the webpage is minimized, the advertisement has been scrolled off of the screen, or another object has been overlaid on top of the advertisement. For example, impression credit for an advertisement may be based on (a) how long the advertisement was visible in a first position of the webpage prior to being overlaid by an object or window and (b) how long the advertisement was visible in a second position of the webpage after being moved to the second position as a result of the overlay. In some embodiments, impression credit may be discounted by an amount (e.g., percentage) when an advertisement is only partially visible to the viewer since part of the advertisement is not visible (e.g., obscured).

In some embodiments, a computing device may send, to a client or user device, a presentation such as a webpage including multiple advertisements for display at the client or user device. In response to determining that an advertisement, of the multiple advertisements, displayed by the user device has been overlaid by an object, the computing device may determine whether to resize or reposition one or more advertisements of the multiple advertisements on the webpage.

In some embodiments, a computing device may compare a priority level of a first advertisement of a presentation such as a webpage and a priority level of a second advertisement of the webpage. The first advertisement may be at least partially obscured and the second advertisement might not be obscured. The computing device may send, to a user device, an instruction to move the first advertisement to a position of the second advertisement on the webpage.

In some embodiments, one or more computing devices may receive a visible display duration for an advertisement prior to the advertisement being at least partially obscured. The one or more computing devices may receive a visible display duration for the advertisement after being moved to a visible area of the webpage. In response to determining that the visible display duration for the advertisement prior to the advertisement being at least partially obscured is less than a minimum display duration, the computing device may determine impression credit for the advertisement based on the visible display duration for the advertisement on the webpage after being moved to the visible area of the webpage.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 10 depicts an example of an obscuration report in accordance with one or more illustrative aspects discussed herein.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
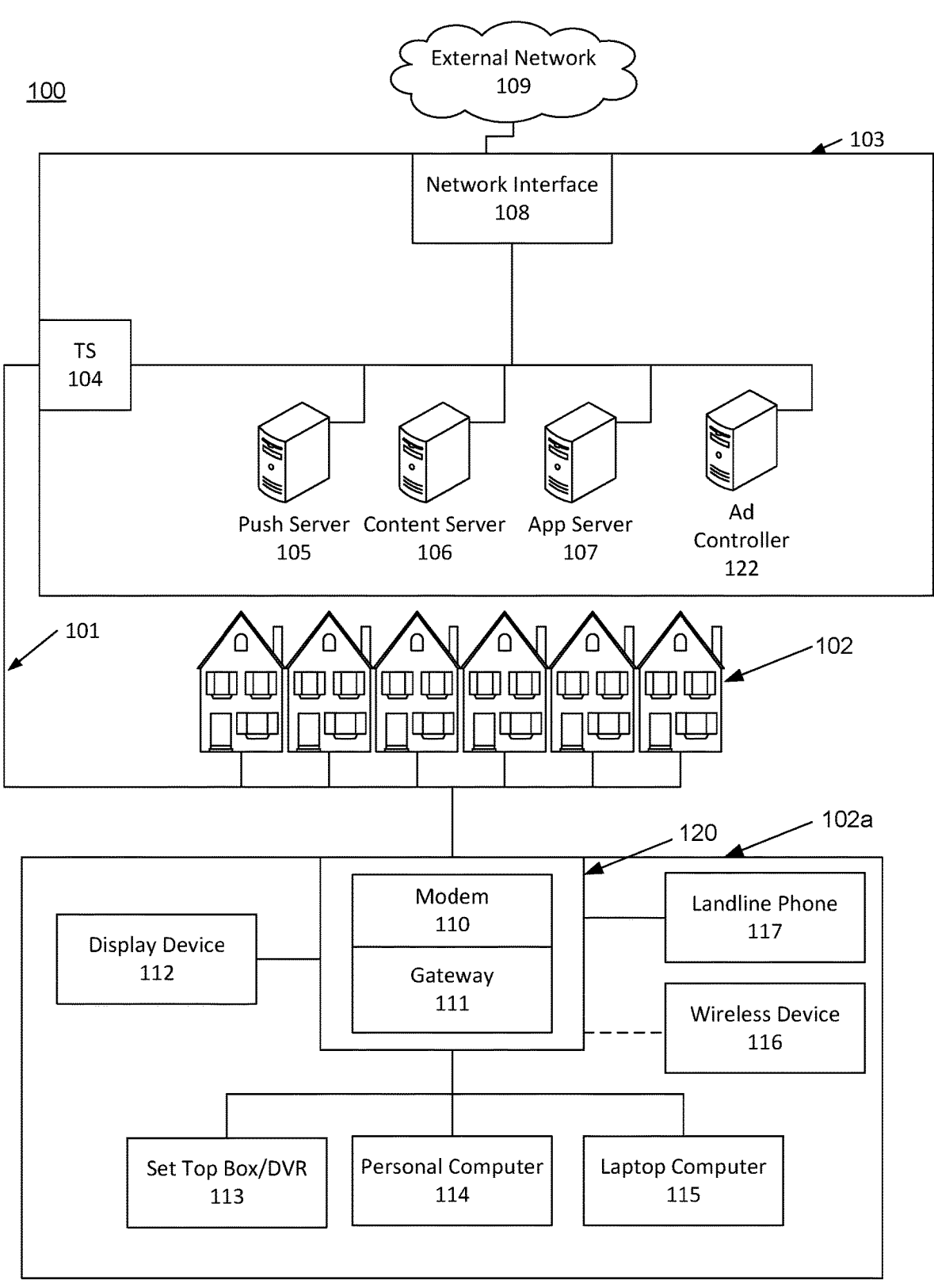
FIG. 1 depicts an illustrative communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of the links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines of the links 101), a fiber interface node (for fiber optic lines of the links 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The local office 103 may include an advertisement controller 122. Although shown separately, the advertisement controller 122 may be combined with one or more of the push server 105, the content server 106, and the application server 107. The advertisement controller 122 may be a computing device responsible for determining which advertisements are placed on webpages and the size and position of each advertisement on the webpage. The advertisement controller 122 may, in response to receiving a request for a webpage from a user device (e.g., a client device), determine advertisement targeting data (e.g., advertisement target group) of the user. For example, the advertisement controller 122 may identify the user using an identifier of the user or the user device (e.g., MAC address) and may lookup advertisement targeting data in advertisement targeting database using the identifier. The advertisement controller 122 may then select one or more advertisements from a local or remote database of advertisements based on the retrieved advertisement targeting data and may determine an advertisement size and position (e.g., location) for each advertisement on the webpage. Once determined, the advertisement controller 122 may generate and send initial configuration data of the webpage to the user device. The initial configuration data may include information for the user device to render the webpage in its browser (e.g., an HTML file of the webpage). The initial configuration data may include the content of the webpage, the determined one or more advertisements for placement at the determined locations of the webpage, and/or instructions for the user's computing device. The instructions may include monitoring instructions for the user device to track visible display time of each of the advertisements of the webpage, monitoring instructions to monitor and detect when an advertisement of the webpage is obscured and/or otherwise not visible to the user, and reporting instructions to report webpage characteristics to the advertisement controller 122 in response to detecting obscurations. The initial configuration data may include other information as will be discussed below.

The advertisement controller 122 may be responsible for determining and/or otherwise defining what kinds of obscurations are possible. An advertisement of a webpage may be considered obscured when at least a portion of the advertisement is no longer visible in a portion of the webpage that is being presented for display to the user. For example, an advertisement may become obscured when at least a portion of the advertisement is overlaid by an object or window thereby blocking the underlying portion of the advertisement from view. In another example, an advertisement of the webpage that is within a visible area of a window of a browser may become obscured when the webpage is scrolled in a direction (e.g., up, down, left, right, or a combination thereof) such that the advertisement is no longer within the visible area of the browser's window. For instance, as the user scrolls the webpage in a direction, the portion of the webpage that is disposed within the visible area of the browser may change and, as a result, an advertisement of the webpage may be moved from being disposed within the visible area to a location outside of (e.g., not within) the visible area such that the advertisement is no longer visible to the viewer. In yet another example, an advertisement may become obscured as a result of resizing the browser in such a manner that at least a portion of the advertisement of the webpage is no longer visible. For example, the advertisement may initially be disposed within a visible area of the window of the browser. However, the visible area of the window of the browser may be reduced as a result of the viewer reducing the size of the browser. In some instances, an advertisement may be within the visible area of the window initially but may not be within the visible area of window after the browser has been resized.

The advertisement controller 122 may receive webpage obscuration identification information (e.g., information identifying an obscuration state of the webpage) from the user device rendering the webpage when the user device has detected that the webpage has been obscured. The webpage obscuration identification information may include an identification of the obscured area of the webpage, identifiers of obscured advertisements, locations of the obscured advertisements, and/or the like. Additionally, the webpage obscuration identification information may include an indication of the amount each obscured advertisement is obscured (e.g., entirely obscured, partially obscured, percentage of obscuration, or the like), an indication of the visible display times of the ads (e.g., 2 minutes), and/or the like.

The advertisement controller 122 may be responsible for determining what kind of reaction to the obscuration should be had (e.g., repositioning the ad, resizing the ad, replacing the ad, etc.), and data needed to support the reaction. For example, the advertisement controller 122 may control placement and size of advertisements of various webpages in order to maximize impression credit for displaying such advertisements to a viewer of the webpage. For example, the advertisement controller 122 may, using the received webpage obscuration identification information discussed above and stored configuration information, determine whether to resize one or more advertisements on the webpage, remove or replace one or more advertisements on the webpage, and/or move one or more advertisements on the webpage respectively to one or more different locations of the webpage. The configuration information for the webpage and/or advertisements of the webpage may include, for each advertisement of the webpage, impression credit parameters, advertisement priority, advertisement location preference, advertisement size preference, other preferences, advertisement identifier, advertisement location, or the like. Additional detail of the operation of the advertisement controller 122 can be found in the description of FIGS. 3 and 4 below.

Figure 2:
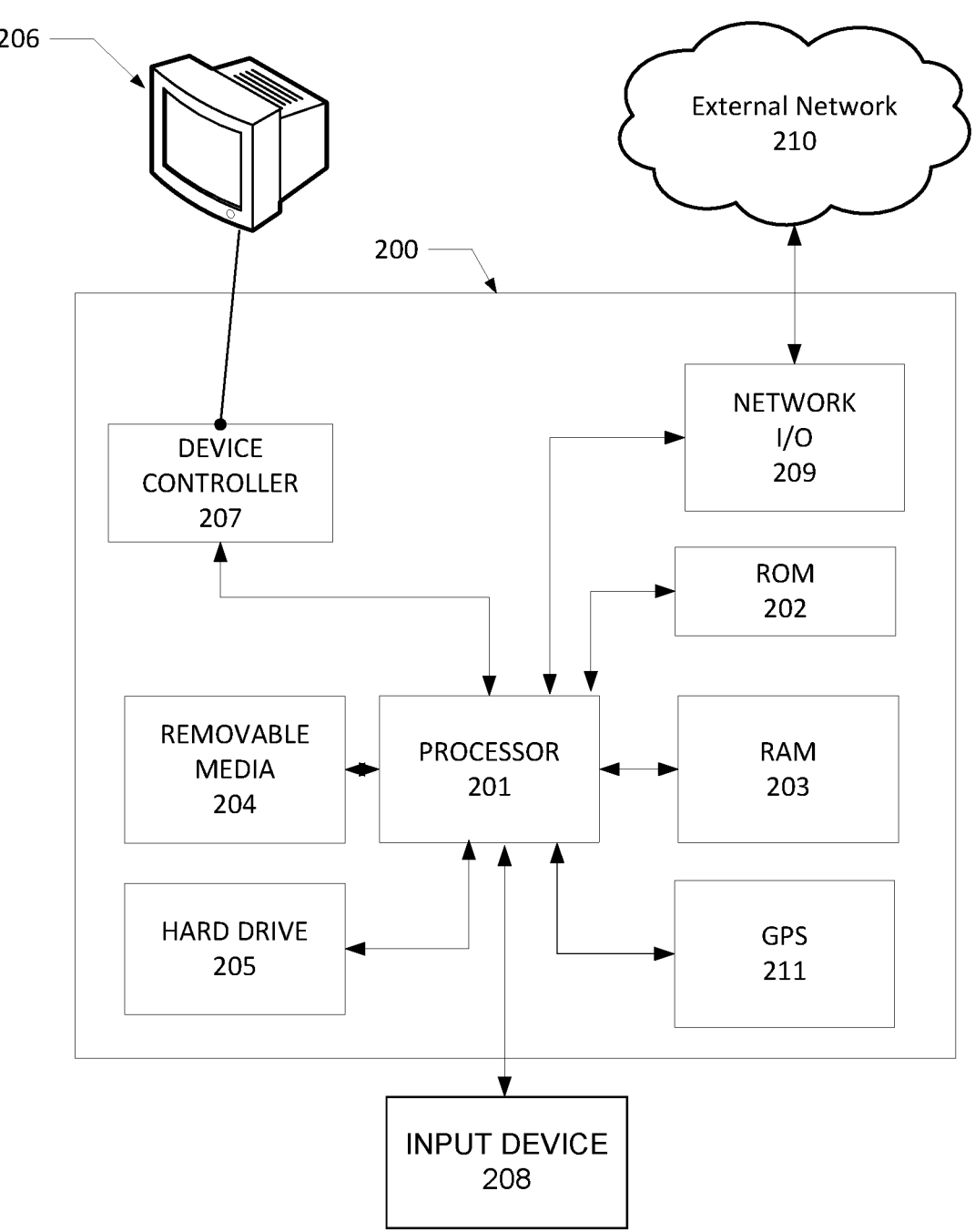
FIG. 2 depicts an illustrative computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
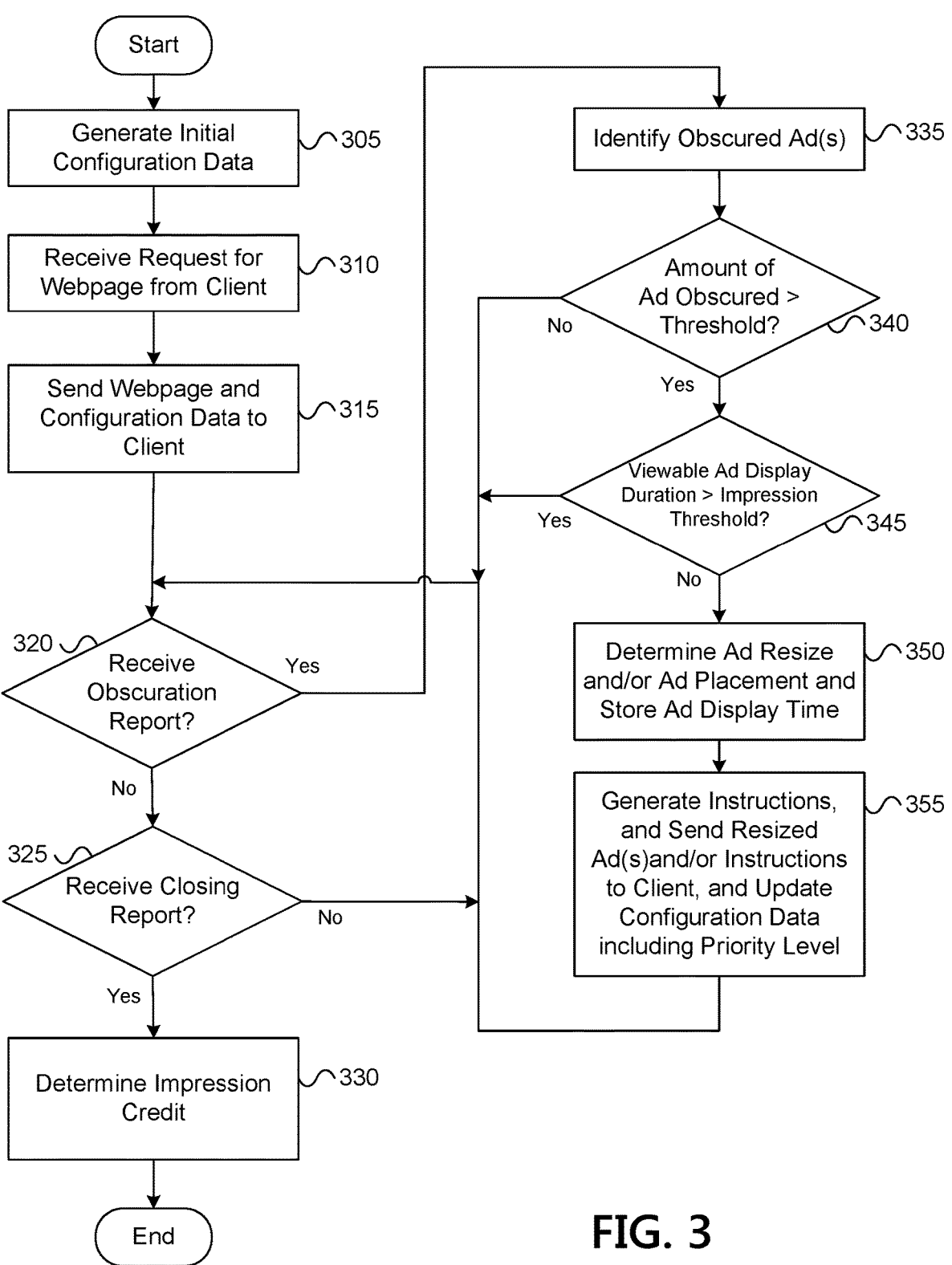
FIG. 3 depicts a flowchart of an illustrative method of providing responsive advertisements for a webpage in accordance with one or more illustrative aspects discussed herein.

FIG. 3 depicts a flowchart of an illustrative method of providing responsive advertisements for a webpage in accordance with one or more illustrative aspects discussed herein. In one or more embodiments, the method of FIG. 3 and/or one or more steps thereof may be performed by a computing device (e.g., computing device 200). In other embodiments, the method illustrated in FIG. 3 and/or one or more steps thereof may be embodied in computer-executable instructions that are stored in a computer-readable medium, such as a non-transitory computer-readable memory. In some instances, one or more of the steps of FIG. 3 may be performed in a different order. In some instances, one or more of the steps of FIG. 3 may be omitted and/or otherwise not performed.

As seen in FIG. 3, the method may begin at step 305 in which a computing device (e.g., the advertisement controller 122) may generate and/or otherwise determine initial configuration data that can define how advertisements in a presentation (e.g., a web page or other resource) should be arranged for presentation to a user. The advertisement controller 122 may obtain configuration data from various entities (e.g., advertisement companies, companies wishing to have their services advertised, etc.). The advertisement controller 122 may receive the configuration data in response to sending the requests to the various entities for the configuration data. While in this instance a pull arrangement is described, in other instances a push arrangement may be utilized (e.g., the advertisement controller 122 may simply receive the configuration information from the various entities without first sending a request to the various entities for the information). In yet other instances, the advertisement controller 122 may itself generate the configuration data.

The initial configuration data may include variety information discussed herein. For example, the initial configuration data may include a hypertext markup language (HTML) file that includes HTML elements to allow a user device to render a requested webpage. The user device may request the webpage via an internet protocol (IP) address. The HTML file may include the content of the webpage and one or more advertisements to be displayed at various locations of the webpage. For example, the HTML file may include advertisement identifiers (IDs) of the advertisements on the web page and identifiers of advertisement locations on the webpage (e.g., pixel coordinates of where the advertisements should appear on the webpage).

The initial configuration data may include various instructions informing user devices as to how advertisements on the webpage should be tracked and reacted to in the event of an obscuration of one or more of the advertisements. As an example, the instructions may instruct the user device to monitor whether each advertisement of the webpage displayed in a window of a browser is visible. If one or more of the advertisement becomes obscured (e.g., beyond a preset obscuration threshold), the user device may, according to the instructions, generate and send an obscuration report of webpage obscuration identification information (e.g., identifiers of obscured ads, the amount each ad is obscured, and the visible display time of the ad prior to being obscured). The instructions may include an internet protocol (IP) address or other address of the advertisement controller 122 to which the user device may send the obscuration report. Additionally, the instructions may also instruct the user device to transmit a closing report upon closing of the webpage.

The initial configuration data may include instructions for tracking visible display duration for one or more advertisements of the webpage, which the advertisement controller 122 may later use to determine impression credit. For example, the instruction may instruct the user device to track how long an advertisement is displayed in an unobscured manner. For example, the instruction may instruct the user device to store a start time beginning when the advertisement is initially displayed in a visible manner and a time when the advertisement became obscured and include this information in the obscuration report discussed above.

The initial configuration data may also include priority levels (e.g., tiers) for each advertisement and for the content of the webpage itself. There may be any number of different priority levels (e.g., 5, 10, 30, etc.). As will be discussed in greater detail below, priority levels may be used to determine which advertisements remain on the webpage when an advertisement on the webpage becomes obscured. Further, the priority levels may be used to determine which advertisements' preferences should be followed in the event that the preferences conflict with the preferences of other advertisements. In some instances, a particular advertisement might not be associated with a priority level. In such instances, the advertisement controller 122 may assign the particular advertisement to the lowest priority level.

The initial configuration data may include a variety of preference information for the advertisements. As an example, the initial configuration data may include advertisement location preferences for various locations of a webpage. Each advertisement may have multiple advertisement location preferences ranked in order of preference. For example, the advertisement location preferences of an advertisement may be, in order of reducing preference, the top left corner of the webpage, the middle right side of the webpage, then the bottom left side of the webpage. The preferences may be in the form of coordinates of specific locations of the webpage, regions of the webpage as illustrated in the example above, and/or other identification of various areas of the webpage. As will be discussed greater detail below, the advertisement controller 122 may use the advertisement location preferences and priority levels to determine where to reposition obscured advertisement on the webpage.

As another example, the initial configuration data may include advertisement size preferences for the advertisements. Each advertisement may have multiple advertisement size preferences ranked in order of preference. For example, the advertisement size preferences of an advertisement may be, in order of reducing preference, a first size of the advertisement, a second size of the advertisement, a third size of the advertisement, and so on. The advertisement size may be indicated in the form of pixel height and pixel width, pixel area, etc. In some instances, a reduced-sized advertisement may be scaled down version of a larger-sized advertisement. In other instances, a reduced-sized advertisement may be a different advertisement relating to the same topic as its larger-sized advertisement. In such other instances, each varying size of the webpage may include different information and/or highlight different information of the services provided by a company. For example, a first size of an advertisement may include a phone number of a company and a logo of the company. A second size of the advertisement may include the logo of the company but might not include the phone number of the company. In some instances, each varying size of the webpage may include a different layout of the information being conveyed in the advertisement. Following the above example, a first size of the advertisement may include logo in a gray color and a first font size and a second size of the advertisement may include the logo in a bright orange color and in a second font size larger than the first font size. As will be discussed in greater detail below, the advertisement controller 122 may use the advertisement size preferences and priority levels to determine what size advertisement should be displayed on the visible area of the webpage.

As yet another example, the initial configuration data may include other preferences. For example, the initial configuration data may include color preferences, font preferences, animation preferences, quality preferences (e.g., high-definition, standard definition, etc.), or the like. Additionally, the other preferences may include preferences for specific combinations of multiple other preferences described herein. For example, a first preference may be to place an advertisement at the top of the webpage irrespective of the size of the advertisement (e.g., a preference to place the advertisement at the top of the webpage even if the advertisement may only be placed at a substantially reduced size). For example, a second preference may be to place the advertisement at the bottom of the webpage in a large size (e.g., a size above one or more other advertisement size preferences).

The initial configuration data may include impression credit parameters for the advertisements. An entity associated with the advertisement controller 122 may charge a company whose services or goods are being promoted by an advertisement based on impression credit. Impression credit may be a tracking mechanism to measure exposure of an advertisement of a webpage to a viewer. The entity may charge on a per-impression basis or some other basis. In some instances, the advertisement controller 122 may award impression credit for an advertisement based on whether the advertisement was visible to the viewer for at least a pre-agreed duration of time. By awarding impression credit for displaying advertisements that are actually visible to the viewer of the webpage, the entity may more accurately charge companies for promoting their goods or services. For instance, the advertisement controller 122 might not use a time period in which an advertisement was obscured in determining impression credit. Additionally or alternatively, the advertisement controller 122 may adjust how the impression credit is determined for a particular advertisement when it becomes obscured. For example, if a portion of the advertisement is obscured, the advertisement controller 122 may reduce an awarded amount of impression credit by a percentage corresponding to the portion of the obscured advertisement, which will be discussed in further detail below. Additionally, the advertisement controller 122 advantageously maximizes impression credit by managing the location and size of the advertisements of the webpage to enable the entity to earn impression credit that the entity would not otherwise earn had the advertisement controller 122 not moved and/or resized one or more advertisements of the webpage as will be discussed in further detail below. The impression credit parameter for a particular advertisement may include a measure of duration of time the advertisement is to be actually visible by a viewer to obtain an impression credit for the advertisement. The duration of time and the amount charged for an impression credit may be pre-negotiated between the entity associated with the advertisement controller 122 and the entity whose services or goods are promoted by the advertisement.

Figure 4:
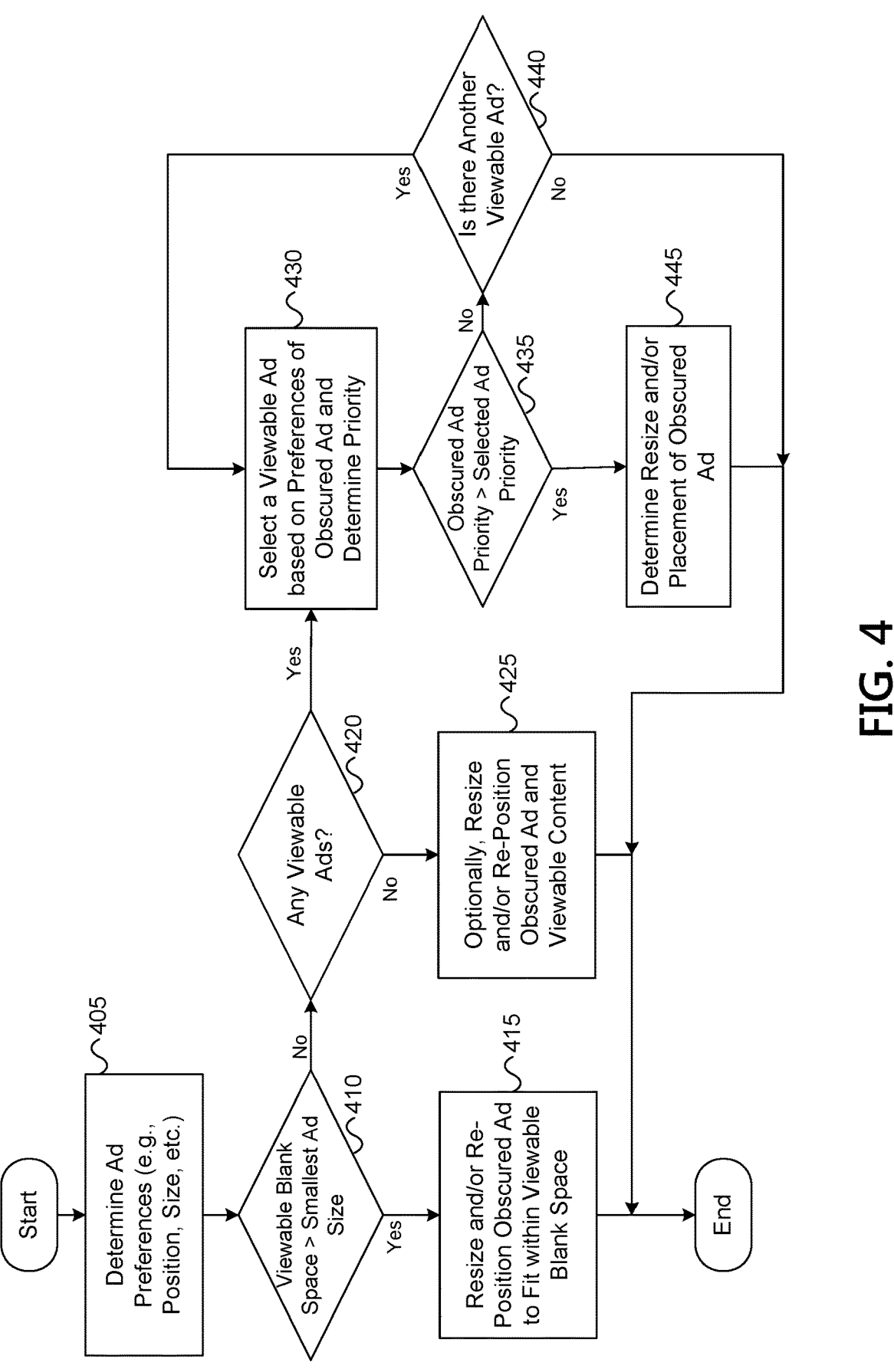
FIG. 4 depicts a flowchart of an illustrative method of determining placement and/or size of one or more advertisements of a webpage in accordance with one or more illustrative aspects discussed herein.

The initial configuration data may include obscuration response rules, which may be a set of rules defining how the presentation of an advertisement may be modified in response to an obscuration event. The obscuration response rules may be part of the initial configuration data. For example, the advertisement controller 122 may use the rules to determine what instructions to send to the user device to modify the presentation of the advertisements on the webpage. The replacement rules have one or more parameters including, for example, each advertisement's size, location, preferences, priority, amount of obscuration, etc. One example of a set of response rules is shown in FIG. 4 discussed below.

As shown in FIG. 3, in step 310, a computing device, such as the advertisement or content controller 122, may receive a request for a webpage from a user or client device. This may occur, for example, when a user directs his/her computer's web browser to a particular website address. The request may be sent in accordance with hypertext transfer protocol (HTTP). In some embodiments, some of the initial configuration data may be generated in response to the request. For example, the request may include an identifier of the user or the user's device (e.g., a MAC address). The advertisement controller 122 may determine advertisement targeting information for the user and place targeted advertisements in the HTML file for display on the webpage. In some cases, step 310 may occur before step 305.

In step 315, the advertisement controller 122 may retrieve the initial configuration data associated with the webpage and may send at least some of the initial configuration data, including the webpage, to the user or client device. For example, the advertisement controller 122 may send an HTML, JSON, XML or other file for use with rendering the webpage, one or more advertisements, advertisement IDs, advertisement locations of the webpage, and instructions to monitor and report characteristics of the webpage as discussed above. As discussed above, in some embodiments, the advertisement controller 122 may select one or more advertisements for display on the webpage based on advertisement targeting data for the user.

In step 320, once the advertisement controller 122 has sent the initial configuration data to the user device, the advertisement controller 122 may continuously or periodically determine whether an obscuration report relating to an obscuration state of an advertisement on a webpage has been received from the user device.

In response to a determination that the advertisement controller 122 has received an obscuration report from the user device, the advertisement controller 122 may, in step 335, identify the one or more obscured advertisements of the webpage using the obscuration report. FIG. 10 depicts an example of an obscuration report in accordance with one or more illustrative aspects discussed herein. For example, the obscuration report may identify, for a webpage, the advertisement IDs and advertisement locations of the obscured ads. In another example, the obscuration report may include a set of display coordinates defining an area of the webpage that has been obscured or a set of display coordinates of an area of the webpage not obscured. In such an example, the advertisement controller 122 may, using the stored advertisement locations of the webpage, identify which advertisements have been obscured based on either set of coordinates. The obscuration report may include an indication of an amount (e.g., a percentage) that an advertisement is obscured and may also include the visible display duration of each advertisement (e.g., how long each advertisement has been displayed prior to being obscured). In some embodiments, the obscuration report may identify the type of obscuration, such as, for example, that the advertisement of the webpage has been overlaid by another window or the viewer has scrolled the webpage such that the advertisement is no longer in a visible area of the browser. In some instances, the obscuration report may identify the object, window, or application that is being overlaid on top of the advertisements of the webpage.

In step 340, the advertisement controller 122 may, for each obscured ad, determine whether an amount an advertisement is obscured is greater than a predetermined threshold amount specific to the advertisement. Various advertisers may permit a certain amount of their advertisements to be obscured. For example, the obscuration report may include the amount (e.g., a percentage, pixel coordinates, identification of the elements that were obscured, etc.) an advertisement is obscured and the advertisement controller 122 may compare this amount with the predetermined threshold amount for the advertisement. In response to a determination that, for each advertisement, the amount the advertisement is obscured is not greater than the predetermined threshold amount, the advertisement controller 122 may ignore the obscuration of the advertisement and may send an indication to the user device to ignore the obscuration of the advertisement and may proceed to step 320 with respect to that advertisement.

Additionally or alternatively, in some embodiments, various advertisers may permit a first specific portion of the advertisement to become obscured. For example, an advertiser may permit a lower right portion of the advertisement to become obscured because that portion of the advertisement may include information to hours of operation. However, the advertiser might not permit a second specific portion of the advertisement to become obscured because that portion of the advertisement may include information of greater importance to the advertiser (e.g., a telephone number of the advertiser). If none of the advertisements are obscured or only the respective first specific portions of an advertisement is obscured, the advertisement controller 122 may proceed to step 320 with respect to that advertisement. However, if the respective second specific portion of the advertisements is obscured, the advertisement controller may proceed to step 345. The various portions may be identified using pixel coordinates, webpage section identifiers, or the like.

In step 345, the advertisement controller 122 may determine whether each obscured advertisement's visible display duration is greater than a predetermined threshold (e.g., a predetermined display duration) for receiving impression credit. For example, the advertisement controller 122 may compare the advertisement's visible display duration with the predetermined display duration specific to the advertisement. The threshold display duration may indicate a minimum amount of time (e.g., duration) that an advertisement is desired to be displayed (e.g., show the advertisement for at least 5 seconds), and the advertiser may decide that it is ok for the advertisement to be scrolled off of the screen or otherwise obscured if the advertisement were already displayed for that predetermined threshold display duration. For example, the predetermined display duration may be a visible display duration sufficient to obtain full impression credit for the advertisement. In response to a determination that the advertisement's visible display duration is greater than the predetermined display duration, the advertisement controller 122 may ignore the obscuration for the advertisement and may send an indication to the user device to ignore the obscuration with respect to that advertisement. The obscuration for the advertisement may be ignored in this instance because the advertiser may already obtain impression credit for displaying the advertisement to the viewer.

Additionally, in an instance where each of the obscured advertisements has a visible display duration above the respective predetermined display duration, the process may proceed to step 320. In response to a determination that at least one of the obscured advertisements' visible display duration is not greater than the predetermined display duration, the advertisement controller 122 may proceed to step 350 (to resize or relocate the advertisement) since the advertiser has not yet received impression credit for the obscured advertisement. Thus, the advertisement controller 122 may determine whether to resize or relocate an advertisement based on a determination that impression credit for the advertisement has not been obtained.

If at least one of the advertisements was obscured too much (e.g., greater than the predetermined amount) and was not displayed long enough (e.g., less than the threshold duration), then in step 350, the advertisement controller 122 may determine to adjust one or more advertisements on the webpage to maximize impression credit. The advertisement controller 122 may determine to move advertisements on the webpage, resize advertisements on the webpage, and/or remove advertisements from the webpage as will be discussed in detail in FIG. 4.

Additionally, for each advertisement that has already been displayed longer than its respective threshold duration, the advertisement controller 122 may reduce the priority level of those advertisements since impression credit can already be obtained the advertisement. For example, these advertisements' priority level may be reduce to the lowest priority level so that obscured advertisements may have a higher priority when the advertisement controller 122 is determining how to resize and/or reposition various advertisement as discussed below. The advertisement controller 122 may maintain the priority level of any advertisements that have not yet been displayed long enough to obtain impression credit. The reduction in priority level may be performed prior to performing the steps of FIG. 4.

FIG. 4 depicts a flowchart of an illustrative method of determining placement and/or size of one or more advertisements of a webpage in accordance with one or more illustrative aspects discussed herein. In one or more embodiments, the method of FIG. 4 and/or one or more steps thereof may be performed by a computing device (e.g., computing device 200). In other embodiments, the method illustrated in FIG. 4 and/or one or more steps thereof may be embodied in computer-executable instructions that are stored in a computer-readable medium, such as a non-transitory computer-readable memory. In some instances, one or more of the steps of FIG. 4 may be performed in a different order. In some instances, one of more of the steps of FIG. 4 may be omitted and/or otherwise not performed. Each of the steps of FIG. 4 may be in the form of one or more obscuration response rules the advertisement controller 122 may use in determining how to modify the presentation of the advertisements on the webpage.

While the below method of FIG. 4 will be discussed for one particular obscured advertisement of the webpage, the method may be performed for each obscured advertisement of the webpage. In the FIG. 4 example, if an advertisement becomes obscured and is only partly visible, the advertisement controller 122 first tries to see if a smaller version of the obscured advertisement will fit in the area of the original advertisement that remains visible, and if so, resizes the advertisement of fit in the area of the original advertisement that remains visible. If a smaller version cannot fit, then the controller 122 may determine whether the obscured advertisement (or a smaller version) can be relocated to a different place on the webpage, such as a blank space or perhaps even swapping places with another advertisement that is still visible to the user. In some instances, advertisement controller 122 might not resize or replace the advertisement with a smaller advertisement to fit within an area of the advertisement that remains visible. For example, the advertiser may specify a minimum advertisement size as one of its preferences in the initial configuration data. In such an example, the advertisement controller 122 might not resize or replace the advertisement with a smaller advertisement if the smaller advertisement's size would be less than the minimum advertisement size. If the advertisement does not have an unobscured portion or the unobscured portion of the advertisement is not of sufficient size (e.g., greater than a minimum advertisement size), the advertisement controller 122 may proceed to step 405 as discussed below.

As seen in FIG. 4, the method may begin at step 405 in which a computing device (e.g., the advertisement controller 122) may determine advertisement preferences for the advertisements of the webpage. As discussed above, the advertisement controller 122 may store configuration data for a webpage and for one or more advertisements of the webpage. The configuration data may include, for each advertisement, advertisement location (position) preferences, advertisement size preferences, advertisement quality preferences, and/or any other preferences. In step 405, the advertisement controller 122 may retrieve the stored location, size, quality and other preferences of the obscured advertisement of the webpage.

In step 410, the advertisement controller 122 may determine whether one or more visible (e.g., unobscured) blank space areas of the webpage is greater than a minimum (e.g., smallest) advertisement size preference of the obscured advertisement of the webpage, to see if the obscured advertisement can be moved to a different location to remain visible (resizing to a smaller size if needed). For example, an advertiser may set a minimum advertisement size as one of its advertisement size preferences (e.g., a smallest advertisement size of the advertisement size preferences). The advertisement controller 122 may determine one or more visible blank space areas of the webpage from the obscuration report received from the user device. In some embodiments, the obscuration report may include an identification of the blank space area (e.g., pixel coordinates defining the blank space area). Additionally or alternatively, the obscuration report may identify coordinates of either the visible area of the webpage or the obscured area of the webpage and the advertisement controller 122 may, using such coordinates and the stored configuration data defining locations of each of the blank spaces of the webpage, determine the visible blank space areas of the webpage. The advertisement controller 122 may then compare a minimum advertisement size preference (e.g., pixel width x and pixel height y) corresponding to the obscured advertisement with each of the visible blank space areas of the webpage to determine whether an obscured advertisement may be sized to fit within any of the visible blank space areas (e.g., that a different-sized version of the obscured advertisement may fit within a visible blank space area and remain visible).

In step 415, in response to a determination that one or more of the visible blank space areas of the webpage is greater than the minimum advertisement size preference corresponding to the obscured advertisement (also referred to herein as potential visible blank space areas), the advertisement controller 122 may determine to resize and/or move the obscured advertisement to fit within one of the visible blank space areas. For each potential visible blank space area, the advertisement controller 122 may evaluate the various alternative advertisement size preferences (e.g., alternative sizes) of the obscured advertisement and determine the largest one that will fit into the visible blank space area. In some embodiments, the advertisement controller 122 may select the largest of the potential visible blank space areas to move the resized obscured advertisement to that area such that the resized obscured advertisement is visible.

Alternatively, in some embodiments, rather than simply selecting the largest potential visible blank space area, the advertisement controller 122 may select the potential visible blank space area with the most preferred advertisement location using the obscured advertisement's advertisement location preferences. For example, the advertisement controller 122 may determine which potential visible blank space areas are in locations of the webpage that match advertisement location preferences of the obscured advertisement and may select one of the potential visible blank space areas based on the obscured advertisement's location preferences. As an example, the obscured advertisement's location preferences may be, in order of reducing preference, the top left corner of the webpage, the middle left side of the webpage, the bottom left corner of the webpage, and then the middle right side of the webpage. The advertisement controller 122 may determine that the middle left side and the bottom left corner of the webpage each include potential visible blank space areas (e.g., visible blank space areas greater than the minimum advertisement size preference). Because the obscured advertisement's has a higher preference for the middle left side than the bottom left corner of the webpage, the advertisement controller 122 may select the middle left side and select the largest resized version of the obscured advertisement to fit within the middle left side's visible blank space area. In some embodiments, the advertiser may rank the combinations and the advertisement controller 122 may select visible blank space areas that meet the highest ranked combination of preferences. In other embodiments, each visible blank space area may be scored to determine the ranking as will discussed in further detail below.

Alternatively, in some embodiments, rather than simply selecting the largest potential visible blank space area or selecting the most preferred advertisement location, the advertisement controller 122 may select one of the potential visible blank space areas based on combinations the obscured advertisement's location and size preferences. For example, the advertisement controller 122 may determine which potential visible blank space areas are in locations of the webpage that match advertisement location preferences of the obscured advertisement. Additionally, the advertisement controller 122 may determine the largest sized advertisement that may be fit within each of those potential visible blank space areas and may match those sizes with the obscured advertisement's size preferences. Following the above example, although the middle left side is a preferable location to the bottom left corner, the bottom left corner may have a preferably larger potential visible blank space area than that of the middle left side. In some instances, the advertisement controller 122 may select the potential visible blank space area located at the middle left side of the webpage even though such a selection results in a smaller resized advertisement to fit within the selected potential visible blank space area. The advertisement controller may select the middle left side because the middle left side has a higher advertisement location preference level than the bottom left corner and may allow for an ad preference size acceptable to the advertiser. In other instances, the advertisement controller 122 may select the potential visible blank space area located at the bottom left corner due to its larger area and, thus, allowing for a larger resized advertisement to fit within the selected potential blank space area. The advertisement controller 122 may then evaluate the different advertisement sizes and select the largest one that will fit within the selected visible blank space area.

Accordingly, by using combinations of the obscured advertisement's location and size preferences, the advertisement controller 122 may select potential visible blank space areas based on an advertiser's preference for the advertisement's location over the advertisement's size or an advertiser's preference for the advertisement's size over the advertisement's location. For example, advertiser may consider placing a smaller advertisement at the top left corner of the webpage to be preferable to placing a larger advertisement at the bottom of the webpage. For example, another advertiser may decide that placing a larger advertisement at the bottom of the webpage is preferable to placing a smaller advertisement at the top or middle of the webpage.

Additionally or alternatively, in some embodiments, the advertisement size preference may include preferred advertisement widths, advertisement lengths, areas, or the like. For example, the advertisement size preferences of an advertisement may be, in order of reducing preference, that the advertisement length be at least 250 pixels, that the advertisement width be at least 300 pixels, etc. The advertisement controller 122 may evaluate each of the visible blank space areas and select the visible blank space area that meets a highest advertisement size preference. The advertisement controller 122 may then evaluate the different advertisement sizes and select the largest one that will fit within the selected visible blank space area.

In step 420, in response to a determination that none of the visible blank space areas are greater than the smallest available size of the obscured advertisement or that there is no visible blank space (e.g., there is no visible blank space that will fit a smaller version of the obscured advertisement), the advertisement controller 122 may determine whether the webpage has any visible advertisements, which may be candidates for being replaced by the obscured advertisement. In some instances, the obscuration report received from the user device may identify the visible advertisements. In alternative instances, the obscuration report may provide coordinates indicating either the visible area of the webpage or the obscured area of the webpage and the advertisement controller 122 may, using such coordinates and the stored configuration data defining the advertisement locations of the webpage, determine any visible advertisements of the webpage. The coordinates may be in form of at least two (x, y) coordinates where x corresponds to a horizontal axis of the webpage and y correspond to a vertical axis of the webpage. The advertisement controller 122 may identify the area of the webpage that is visible using the received coordinates. The advertisement controller 122 may then identify, using the stored configuration data, advertisement locations that are disposed within the visible area of the webpage. For example, the obscuration report may include a bitmap of the window identifying the specific pixels of the webpage that are displayed. For example, the obscuration report may include a listing of advertisements that are visible. The advertisement controller 122 may then use the listing to identify the advertisement locations disposed within visible area of the webpage.

In step 425, in response to a determination that there are not any visible advertisements on the webpage, the advertisement controller 122 may optionally determine to rearrange the webpage content that remains visible, to make room for the obscured advertisement (or a smaller/resized version of the obscured ad). The advertisement controller 122 may determine to move content of the webpage from a visible area of the webpage to another location of the webpage such as another visible area of the webpage or, alternatively, an area of the webpage that is not visible. The advertisement controller 122 may then move the obscured advertisement or its resized advertisement to the original location of the moved content.

In one or more arrangements, each content item of the webpage may also be assigned a priority level, and this priority level may be used to determine whether the other content should be rearranged to make room for the obscured advertisement in step 425, and in other rearranging options described further below. In such arrangements, the advertisement controller 122 may compare the priority level of the content of the webpage with the priority level of the obscured advertisement. In response to a determination that the priority level of the content item of the webpage is greater/higher than the priority level of the obscured advertisement, the advertisement controller 122 may determine to maintain the current position of the content item on the webpage and may determine to not resize and/or reposition the content item so that it remains visible to the user. In instances where an advertisement has already been removed from the webpage (discussed below), the advertisement controller 122 might not reinsert the advertisement into the webpage. In response to a determination that the priority level of the content item of the webpage is not greater/higher than the priority level of the obscured advertisement, the advertisement controller 122 may determine to move the content item of the webpage to make room for the obscured advertisement as discussed above. In some embodiments, each of the content items of the webpage may be assigned the same priority level or different priority levels. In some embodiments, each content type (e.g., text, image, video, etc.) may be assigned a different priority level. For example, the text of a sports webpage may be assigned one priority level, the pictures of the webpage may be assigned another level, and a menu of the webpage may be assigned another priority level.

In step 430, in response to a determination that there are one or more advertisements of the webpage that are visible, the advertisement controller 122 may select one of those visible advertisements to surrender its position and be replaced by the obscured advertisement (or a resized version of the obscured advertisement). The selection of such an advertisement may be based on the priority level and combinations of advertisement location and size preferences of the obscured advertisement for replacement with the obscured advertisement.

The advertisement controller 122 may, using the obscuration report and configuration data, determine the location and size of each of the visible advertisements. In some instances, the obscuration report may include the location and size of each of the visible advertisements. In other instances, the obscuration report may include an indication of the obscured advertisements, an obscured area of the webpage, a visible area of the webpage, and/or the like. The advertisement controller 122 may then analyze the configuration data using this information to determine the location and size of each of the advertisements. For example, if the report included an indication of the obscured area of the webpage, the advertisement controller 122 may determine the visible area of the webpage and identify advertisements within the visible area of the webpage.

Once the location and size of the visible advertisements are determined, the advertisement controller 122 may determine which of the visible advertisements have a size and location that matches a combination of obscured advertisement's size and location preferences to generate a candidate list of visible advertisements.

The advertisement controller 122 may then rank candidate list to determine an order by which to select the candidate visible advertisements. In some embodiments, the advertiser may rank the combinations of an advertisement's size and location preferences. A higher rank may indicate a higher preference for the combination. The advertisement controller 122 may rank the candidate list according to the combinations rank. In other embodiments, the advertisement controller 122 may weight each size and location preference by assigning the preferences various point values to reflect the preferences. For example, more preferred preferences may have a higher point value than less preferred preferences. For example, the top left corner position may be worth 3 points. The bottom right corner position may be worth 0 points. A size greater than 640×640 pixels may be worth 2 points, and greater than 900×900 pixels may be worth another point, etc. The advertisement controller 122 may score each of candidate visible advertisements. For example, a candidate visible advertisement that has a size of 640×604 and is located in the top left corner of the webpage may be worth 5 points. The advertisement controller 122 may rank the candidate visible advertisements based their scores. For example, a candidate visible advertisement with a score of 5 points may be ranked higher than another candidate visible advertisement with a score of 4 points. If two or more scores are equal, the advertisement controller 122 may arbitrarily rank one advertisement over another advertisement or apply a preset tie breaking rule. The advertisement controller 122 may then select the highest ranked candidate visible advertisements and proceed to step 435.

If there are no combinations of preferences that match the location and size characteristics of a candidate visible advertisement, the advertisement controller 122 may attempt to determine if there is a visible advertisement that meets at least one preference (e.g., a location preference, a size preference, etc.) and may select that visible advertisement if there is a match. If not, the advertisement controller 122 may simply select any visible advertisement of the webpage and proceed to step 435.

In step 435, the advertisement controller 122 may compare the priority level of the obscured advertisement with the priority level of the selected visible advertisement. If the priority level of the obscured advertisement is not greater than the priority level of the selected visible advertisement, the advertisement controller 122 may, in step 440, determine whether there is another visible advertisement and, if so, may return to step 430 to select another visible advertisement (e.g., the next highest ranked candidate visible advertisement). If, in step 440, the advertisement controller 122 determines that there is not another visible advertisement, the method of FIG. 4 as applied to this obscured advertisement may end.

In this instance, if the priority level of the obscured advertisement was tied with or equivalent to the priority level of the selected visible advertisement, the method would proceed to step 440 to select a different visible advertisement. In an alternative instance, a tie may result in the method proceeding to step 445 to let the obscured advertisement take the place of the selected visible advertisement. In another alternative instance, a tie may result in the advertisement controller 122 performing a tie breaking step based on tie breaker data store in the configuration data and may determine whether to proceed to step 440 or 445 using the results of the tie breaker.

In step 445, if the priority level of the obscured advertisement is greater than the priority level of the selected visible advertisement, the advertisement controller 122 may determine to reposition (relocate) the obscured advertisement from its obscured location to the location of the selected visible advertisement. In one example, the advertisement controller 122 may determine to move the selected visible advertisement from its current location in the webpage. In such cases, the selected visible advertisement may be treated as an obscured advertisement and the advertisement controller 122 may perform the method of FIG. 4 for the selected visible advertisement. In some cases, this may result in the selected visible advertisement being moved to another location of the webpage (either another visible location or an obscured location). In some cases, this may result in the selected visible advertisement being removed entirely from the webpage. In another example, the advertisement controller 122 may determine to reduce the size of the selected visible advertisement to make room for placing the obscured (potentially resized) advertisement in an area made available by the reduction (which is adjacent to the reduced-size selected visible advertisement).

In one or more embodiments, the advertiser may prefer that a certain portion of the advertisement remains visible and the advertisement controller 122 may include an obscuration response rule for such a preference. As an example, an advertisement may include a telephone number, logo, website, and a description of the advertiser's goods and/or services. The advertiser may have a preference that the telephone number and logo remain visible but might not have preference as to whether the website and description remain visible. In one instance, the advertisement's website and description may be obscured but the logo and phone number may remain visible. In such an instance, the advertisement controller 122 may, based on the preference, determine that the advertisement might not be resized and/or repositioned in response to the obscuration of the advertisement because the phone number and logo remain visible. However, there may be other reasons for resizing and/or repositioning the advertisement. For example, another obscured advertisement may have a higher priority that the advertisement and may have preference for the location of the advertisement. In another instance, the advertisement's logo and/or phone number may be obscured but the website and description remain visible. In such an instance, the advertisement controller 122 may, based on the preference, determine to resize and/or reposition the advertisement using the advertisement's priority and/or size and location preferences in a similar manner to that discussed above. In such embodiments, the preference may be part of the initial configuration data discussed above. For example, the initial configuration data may indicate that the phone number is located in the top half of the advertisement and may include its specific location on the webpage. The obscuration report may include an indication of the area obscured or may identify that the top half of the advertisement is obscured. The advertisement controller 122 may then determine that the phone number or logo has been obscured using the information in the obscuration report and the initial configuration data.

In one or more embodiments, the advertisement controller 122 may include an obscuration response rule for how to react based on the type of obscuration. In some embodiments, the advertisement controller 122 might determine to resize and/or reposition advertisements in response to an obscuration based on an overlay but may determine not to resize and/or reposition the advertisements in response to an obscuration based on scrolling the webpage such that one or more advertisements are no longer visible. In some embodiments, the advertisement controller 122 may react differently based on a type or identification of an application overlaying an advertisement. For example, the advertisement controller 122 might determine not to resize and/or reposition an overlaid advertisement when the application overlaying the application is the advertiser's website relating to the product and/or service of the overlaid advertisement. However, if the advertisement was overlaid by a video game window or a different webpage unrelated to the advertiser's good and/or products, the advertisement controller 122 may determine to resize and/or reposition the overlaid advertisement. In some embodiments, the advertisement controller 122 may react differently based on the direction of scrolling. As an example, the advertisement controller 122 may determine not to resize and/or reposition advertisements that become obscured as a result of the user scrolling down the webpage but may determine to resize and/or reposition advertisements as a result of the user scrolling the webpage up, left, or right such that one or more advertisements become obscured. In the above embodiments, obscuration response rules may be part of the initial configuration data discussed above. The obscuration report may include an indication of type of obscuration, how the advertisement became obscured (e.g., scrolling left), and/or an identification of the overlaying application (e.g., browser at a particular webpage's address).

Returning to FIG. 3, in step 355, the advertisement controller 122 may generate placement instructions, send any resized advertisements and/or placement instructions to the user device, and update stored configuration data including the priority level of the advertisements.

The advertisement controller 122 may, for each determination to resize an obscured advertisement, select the resized advertisement from multiple different sized advertisements associated with the obscured advertisement and generate placement instructions for the resized advertisement. The placement instruction for the resized advertisement may include instructions to place the resized advertisement at a specific location of the webpage as well as either instructions of where to move the content or advertisement currently at the location or instructions to remove the content or advertisement currently at the location entirely from the webpage. As discussed above, the advertisement controller 122 may resize an advertisement by selecting a differently sized advertisement associated with the advertisement and sending the differently sized advertisement along with placement instructions to the user device. In an alternative arrangement, rather sending a replacement advertisement, the advertisement controller 122 may instruct the user device to reduce the size of the advertisement currently in the webpage to specific dimensions (e.g., 640 pixels by 640 pixels), and it may be up to the user device to select or generate a differently-sized version of the obscured ad. The advertisement controller 122 may also instruct the user device to relocate the resized advertisement to the top left corner of the visible area of the webpage.

Similarly, the advertisement controller 122, for each determination to move the obscured advertisement and not resized, may generate placement instructions for the obscured ad, which may include instructions to place the obscured advertisement at a specific location of the webpage as well as either instructions of where to move the content or advertisement currently at the location or instructions to remove the content or advertisement currently at the location entirely from the webpage. Once each of the instructions has been generated, the advertisement controller 122 may send the instructions and any resized advertisements to the user device so that the user device may remove content or advertisements from the webpage, move content or advertisements in the webpage, and/or place resized advertisements in the webpage so that they are visible. Additionally, the advertisement controller 122 may supply a replacement advertisement for the user device to place rather than using the obscured advertisement.

In some instances, a resized advertisement or replacement advertisement may have the same or different quality (e.g., HD resolution, bitrate) as the obscured advertisement. In one example, the obscured advertisement may be in a standard definition resolution and the resized or replacement advertisement may also be in a standard definition resolution. In another example, the obscured advertisement may be in a standard definition resolution and the resized or replacement advertisement may be in a high definition resolution. In yet another example, the user device may receive the resized or replacement advertisement at a low bitrate and may receive a higher bitrate version after a predetermined period of time or in response to receiving, at the advertisement controller

122, an indication that the viewer has the advertisement in his or her line of sight (included in the obscuration report). The user device may determine whether a viewer has the advertisement in his or her line of sight through eye-tracking technology. For example, the user device may communicate with an optical sensor that may produce an image or video of persons presently disposed near (e.g., in front of) a display device. The user device may, using the image or video, analyze each person's eye position and line of sight to determine whether the person is viewing the advertisement displayed on the webpage.

As discussed above, the resized advertisement for the obscured advertisement is associated with the obscured advertisement. For example, the resized advertisement and the obscured may promote the same product or service. In one or more other embodiments, the resized advertisement and/or moved advertisement may be for a different product or service of the same entity. For example, the obscured advertisement may be for promoting installing floors by company A and the moved advertisement and/or resized advertisement may be for installing drywall by company A.

The advertisement controller 122 may update the configuration data. For example, the advertisement controller 122 may update the priorities of one or more advertisements of the webpage. In some instances, the advertisement controller 122 may update the priorities after sending the instructions to the user device. For example, the advertisement controller 122 may identify any advertisements of the webpage it has determined to remove entirely from the webpage and may increase the priority level of the removed advertisement. For example, the advertisement controller 122 may identify any advertisements that have been moved from a visible area of the webpage to an obscured area of the webpage and may increase the priority level of the moved advertisement. As a result of increasing the priority levels of these advertisements the advertisements may be more likely to be placed in visible locations of the webpage in the future.

The advertisement controller 122 may store advertisement location history data identifying the different versions of an advertisement that were shown and tracking the history of the advertisement's appearance, obscuring, movement and resizing. For example, the advertisement controller 122 may store, in a database, the display start and end times of the advertisements or its visible display durations if determined by the user device for later use in determining impression credit discussed infra. The advertisement controller 122 may also store the advertisement IDs to manage and/or retrieve the timing information for the advertisement from the database. In some embodiments, the advertisement controller 122 may store each obscuration report in the database.

In step 320, the advertisement controller 122 may again monitor whether another obscuration report has been received from the user device. If another obscuration report has been received, the advertisement controller 122 may proceed to perform steps 335-355 as discussed above. If another obscuration report has not been received, the advertisement controller 122 may, in step 325, determine whether a closing report has been received from the user device. A closing report may be a report sent in response to the webpage being closed at the user device. As discussed above, the initial configuration data may include instruction to send the closing report. The closing report may include an indication that the report is a closing report. Additionally, the closing report may include, for each advertisement currently on the webpage, an advertisement ID and the latest display start and end times and/or a visible display duration (e.g., a visible display duration since being resized and/or repositioned, a visible display duration since the start of its display if the advertisement was not obscured). In some embodiments, the closing report may include the same information as the obscuration report plus the additional indication that the webpage has been closed.

In some embodiments, the initial configuration data may instruct the user device to periodically store the display start and end times and/or visible display durations of the advertisements on the webpage. Further, the initial configuration data may instruct the user device to send the closing report after rebooting of the user device or application in the event the user device (or its browser) crashes or exits without sending a closing report to the advertisement controller 122. As a result, the advertisement controller 122 may receive a closing report even after the user device crashes. In some embodiments, the advertisement controller 122 may send a message to the user device requesting the closing report after a preset time period since the advertisement controller 122 has sent either the initial configuration data or the latest instruction set responsive to the latest obscuration report. In response, the advertisement controller 122 may receive the closing report.

If the advertisement controller 122 has not received the closing report and each attempt to obtain the closing report has failed (e.g., the user device has failed), the advertisement controller 122 may use stored visible display durations stored in response to receiving obscuration reports to determine impression credit in step 330.

In step 330, the advertisement controller 122 may, for each advertisement ever displayed on the webpage, determine its impression credit based on a total visible display duration of the advertisement. As discussed above, the initial configuration data may include instruction for the user device to keep track of the visible display time of each of the advertisements for the webpage. The user device may record a display start time and a display end time (e.g., time when the advertisement became obscured or when the webpage closed). The closing report may include, for each ad, a display start time and a display end time or a visible display duration calculated by the user device using the display start time and the display end time. The display start time of an advertisement may be the time at which the advertisement becomes initially visible. The display end time of the advertisement may be the time at which the advertisement becomes obscured or the webpage is closed.

For advertisements that might not have been unaltered (e.g., not moved or resized), the advertisement controller 122 may determine the visible display time based on the initial display time and ending display time of the advertisement. The advertisement controller 122 may then determine whether impression credit should be obtained for the advertisement by determining whether the visible display duration is greater than its predetermined display duration for receiving impression credit. If so, then impression credit for the advertisement may be credited. Otherwise, impression credit for the advertisement might not be credited.

For advertisements that have been previously obscured and/or resized or moved on the webpage, the advertisement controller 122 may determine the total visible display time based on multiple visible display times of the advertisement or its resized version. As an example, an advertisement may have been displayed and then obscured a first time. The advertisement may have been moved and/or resized so that the advertisement is visible once again. The resized and/or repositioned advertisement have been obscured a second time. The advertisement may have been moved and/or resized a second time so that the advertisement is visible once again. The webpage may have then been closed at the user device.

Based on the above example, the advertisement controller 122 may have stored, in response to receiving a first obscuration report, a first visible display time for an advertisement (e.g., when the advertisement was initially displayed in the user device's browser) and a first visible display end time (e.g., a time at which the obscuration of the advertisement occurred) in step 355. The advertisement controller 122 may compute a first visible display duration based a temporal difference between the first visible display start and end times. Similarly, the advertisement controller 122 may have stored, in response to receiving a second obscuration report, a second visible display start time (e.g., a time when a resized and/or repositioned version of the advertisement was displayed) and a second visible display end time (e.g., a time when the resized and/or repositioned version of the advertisement was obscured) in step 355. The advertisement controller 122 may compute a second visible display duration based a temporal difference between the second visible display start and end times. The advertisement controller 122 may have stored information received in the closing report including a final visible display start time (e.g., a time when another resized and/or repositioned version of the advertisement is displayed) and a final visible display end time (e.g., the time when the webpage is closed). The advertisement controller 122 may compute a final visible display duration based a temporal difference between the final visible display start and end times.

The advertisement controller 122 may aggregate and/or otherwise sum each of the visible display durations of the advertisements or its resized and/or repositioned versions. The advertisement controller 122 may then determine whether impression credit should be obtained for the advertisement by determining whether the aggregated visible display duration is greater than its predetermined display duration for receiving impression credit. If so, then impression credit for the advertisement may be credited. Otherwise, impression credit for the advertisement might not be credited.

While only one intermediate visible display duration (e.g., the second visible display duration) is described out of convenience, there may be multiple intermediate visible display durations, for example, when the advertisement is obscured for a third time and moved or resized for a third time.

In some instances, if a visible display duration of an advertisement is below a minimum display duration, the advertisement controller 122 might not include that visible display duration in the calculation of the total visible display duration to determine impression credit. For example, if the minimum display duration is 1 second and the first visible display duration is half a second, the first visible display duration might not be included in determining whether to grant impression credit for the advertisement since the first visible display duration is too short to have made any impression on the viewer.

In some embodiments, the amount an advertisement was obscured may be taken into account when determining impression credit for the advertisement. In one example, the time during which an advertisement is partially visible because the advertisement is partially obscured might not be counted in determining impression credit. In another example, the time during which an advertisement is partially obscured beyond a minimum amount of the advertisement (e.g., more than 10% of the advertisement has been obscured) might not be counted in determining impression credit. However, the time during which the advertisement is obscured by an amount less than or equal to the minimum amount (e.g., less than 10% of the advertisement has been obscured) may be counted in determining impression credit. In some embodiments, impression credit of an advertisement may be discounted by an amount (e.g., percentage) when an advertisement is only partially visible to the viewer since part of the advertisement is obscured. In some embodiments, the advertisement controller 122 may grant impression credit in proportion with amount the partially obscured advertisement is visible. For example, if 10% of an advertisement was obscured, then the advertisement controller 122 may grant 90% of the impression credit the advertisement controller 122 would have otherwise granted had the entire advertisement been visible.

In some embodiments, impression credit may be associated with a particular portion of the advertisement. As an example, an advertisement may include the advertiser's phone number, logo, website, and a brief description of provided goods and/or services. The time during which the advertisement is partially obscured may be counted in determining impression credit as long as the phone number and logo of the advertisement remain visible. However, the time during which the phone number and/or logo are obscured might not be counted in determining impression credit even if the website and brief description remain visible.

In some embodiments, impression credit for an advertisement removed from the webpage to make room for another advertisement may be based on the visible display time of the advertisement prior to its removal.

In some embodiments, the advertisement controller 122 may determine impression credit using eye-tracking technology, various sizes of the ad, various quality levels of the ad, various locations of the ad, viewer actions, wearables, or any combination thereof. The determination of impression credit may account for eye-tracking technology employed at the user device. For example, if the user device has eye-tracking capabilities (e.g., is able to track the viewer's eyes to determine where on the screen the viewer is looking), the instructions sent to the user device may instruct the user device to employ its eye-tracking capabilities. The report sent from the user device may include the duration of time in which the viewer had each advertisement in his or her line of sight. The advertisement controller 122 may use these time measurements in its determination of calculation of the impression credit. Additionally or alternative, the determination of impression credit may account for the quality of the ads. For example, an advertisement may be displayed for 10 seconds in a standard definition resolution to obtain impression credit or may be displayed for 7 seconds in a high definition resolution to obtain impression credit. Additionally or alternatively, the determination of impression credit may account for the various sizes of the advertisement that are displayed to the viewer. For example, a smaller advertisement may be displayed for 10 second to obtain impression credit whereas a larger advertisement may be displayed for 5 seconds to obtain impression credit. Additionally or alternatively, the determination of impression credit may account for the various positions on the webpage at which an advertisement is displayed to the viewer. For example, an advertisement in the top left corner of the webpage may be displayed for 5 seconds to obtain impression credit whereas an advertisement at the bottom of the webpage may be displayed for 15 seconds to obtain impression credit. Additionally or alternatively, the determination of impression credit may account for detection of viewer wearables (e.g., smartphone, smartwatch, etc.) under the assumption that a viewer is more likely to be in the presence of the browser if his or her wearable device is in the vicinity of the user device (within a predetermined distance). Wearables may also allow for identification of the viewer to target impression credit. Additionally or alternatively, the determination of impression credit may account for user action (e.g., hovering a mouse pointer over the ad, clicking on the ad, using a search engine to search for a related topic of the ad, etc.).

The advertisement controller 122 may, in some embodiments, maintain a log or record of the various circumstances in which impression credit was obtained to learn which combination of factors (e.g., quality, size, location, etc.) led to obtaining greater amounts of impression credit and may use such knowledge in future selection of resized or replacement ads.

While each of the steps of FIGS. 3 and 4 are described as being performed by the advertisement controller 122, in one or more alternative arrangements, one or more of the steps of FIGS. 3 and 4 may be performed by the user device.

Figure 5:
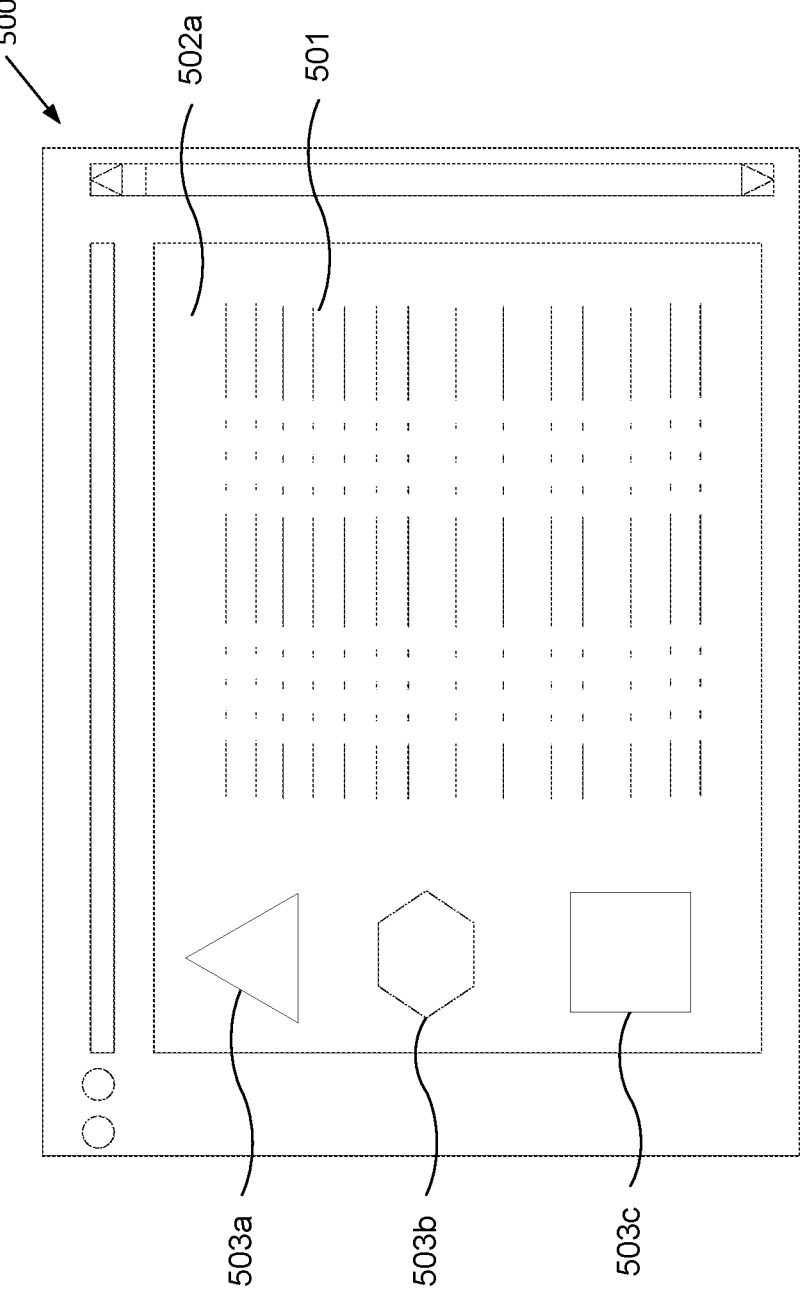
FIG. 5 depicts an example webpage in accordance with one or more illustrative aspects discussed herein.
Figure 6:
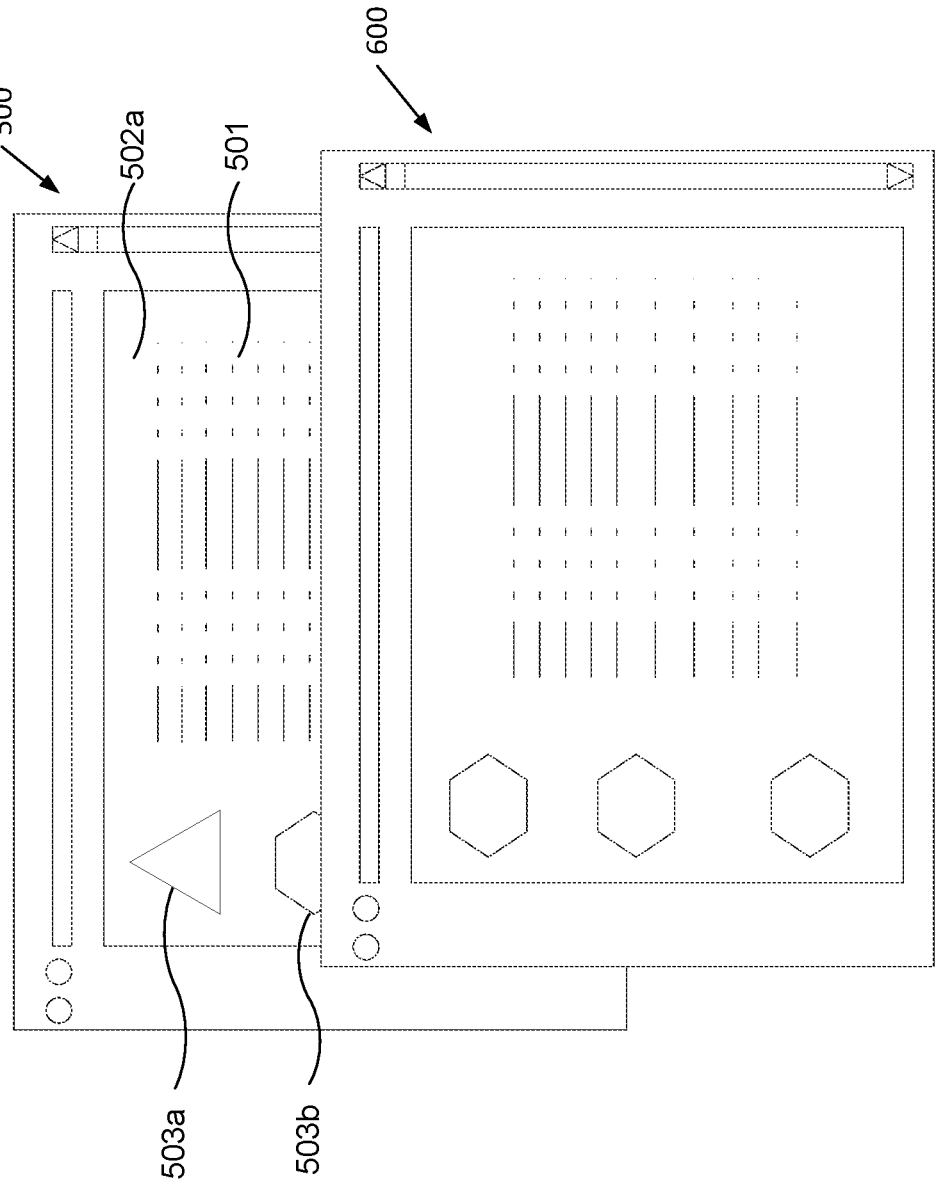
FIG. 6 depicts an example of an obscuration of the webpage of FIG. 5 in accordance with one or more illustrative aspects discussed herein.
Figure 7:
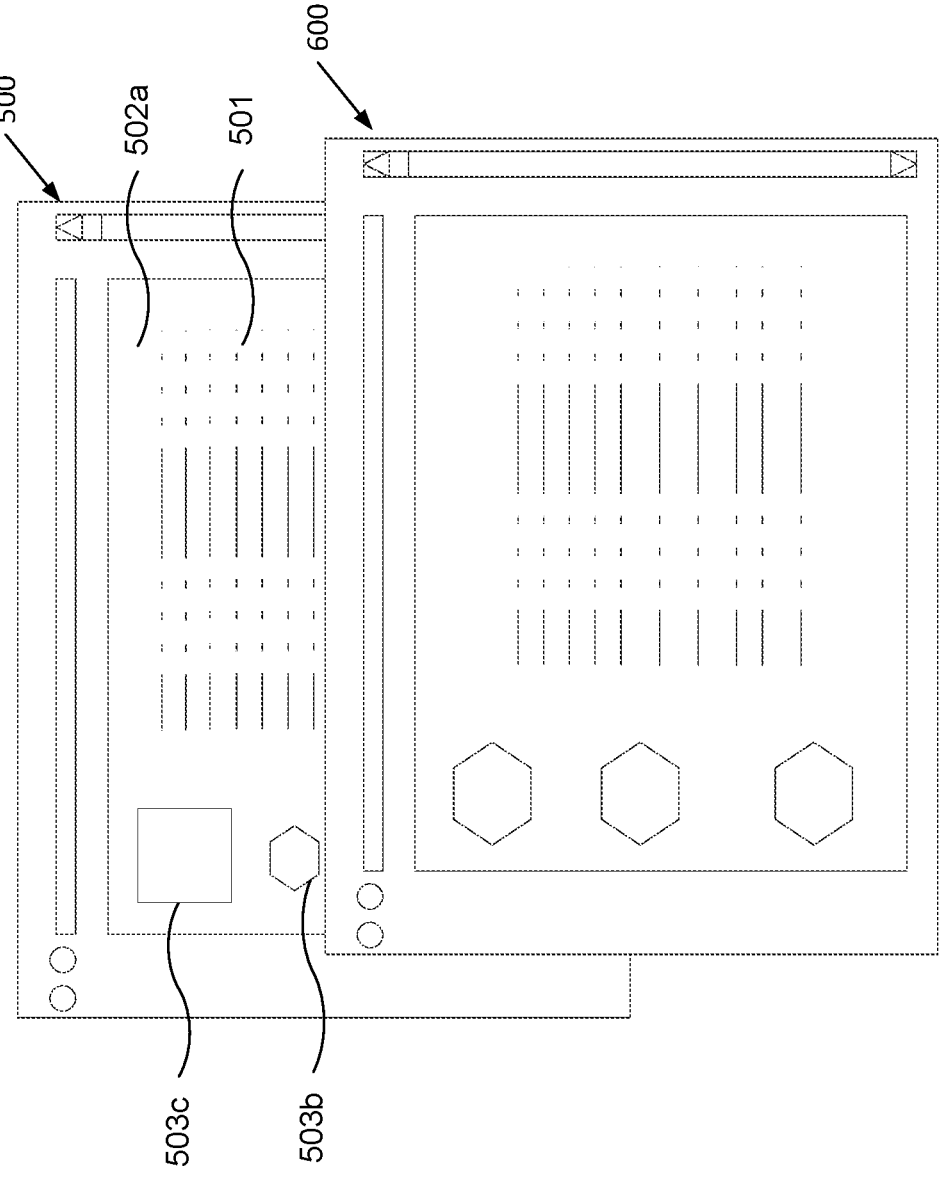
FIG. 7 depicts an example of updated advertisement placement and size on the obscured webpage of FIG. 6 in accordance with one or more illustrative aspects discussed herein.
Figure 8:
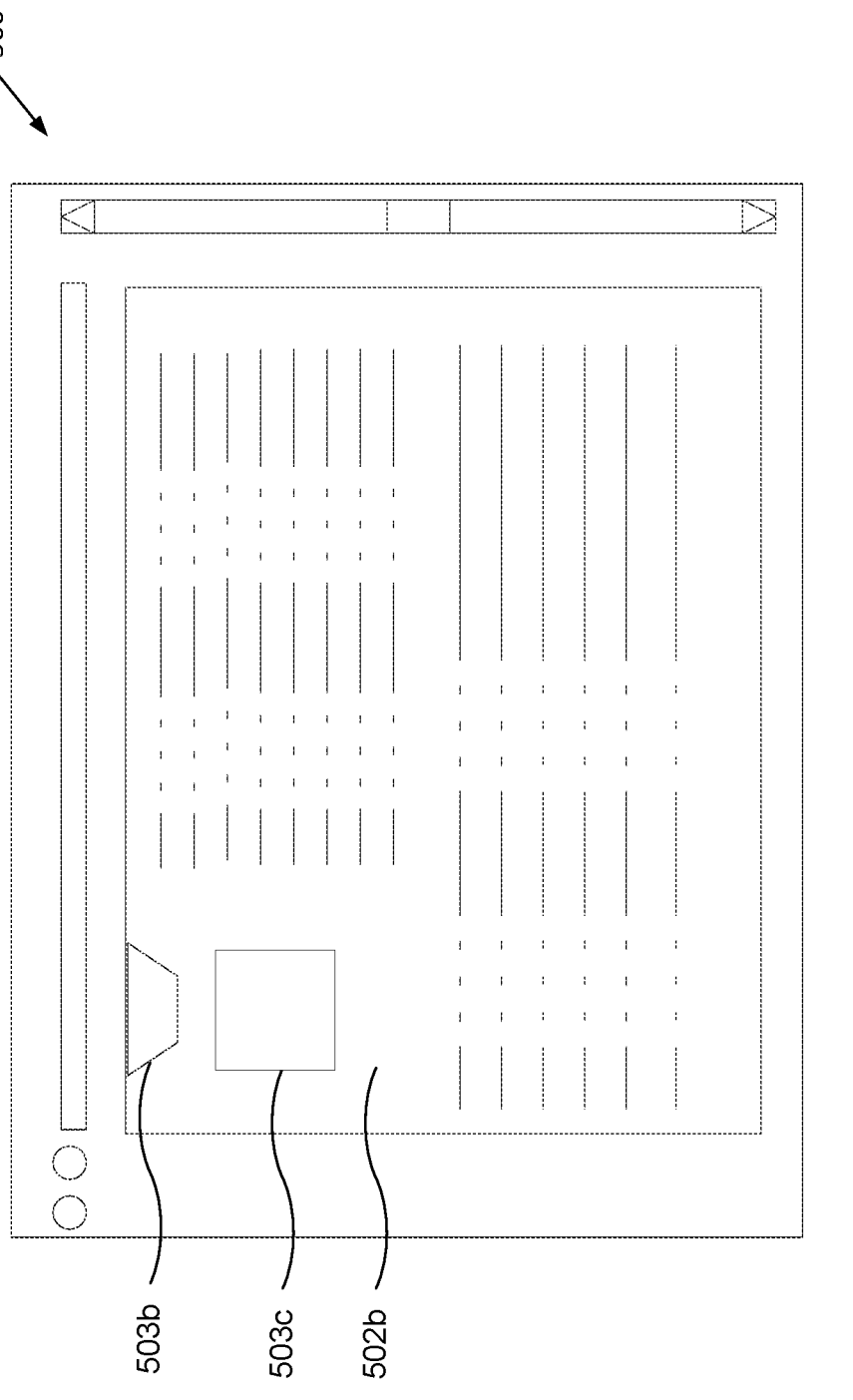
FIG. 8 depicts an example of another obscuration of the webpage of FIG. 5 in accordance with one or more illustrative aspects discussed herein.
Figure 9:
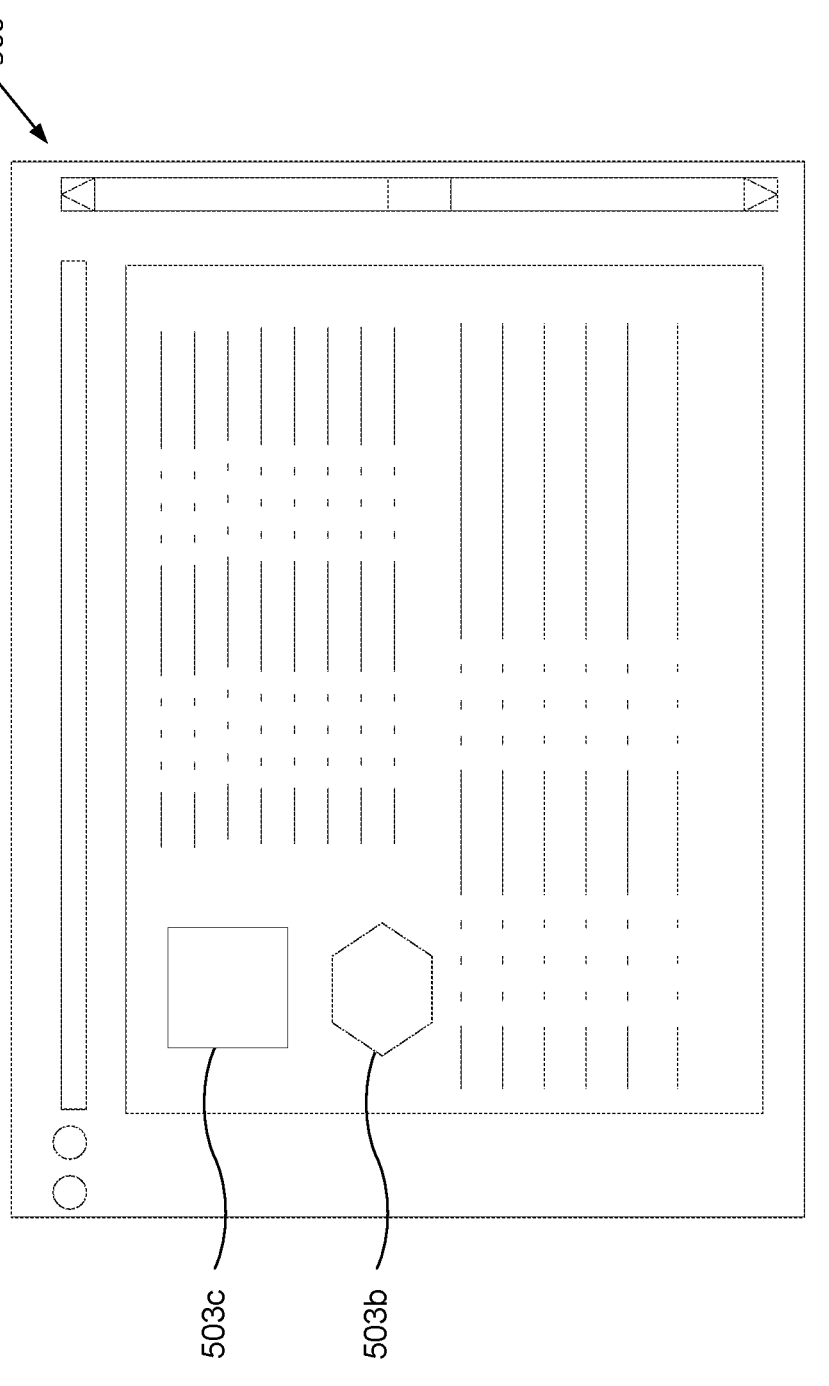
FIG. 9 depicts an example of updated advertisement placement and size on the obscured webpage of FIG. 8 in accordance with one or more illustrative aspects discussed herein.

FIG. 5 depicts an example webpage in accordance with one or more illustrative aspects discussed herein. FIG. 6 depicts an example of an obscuration of the webpage of FIG. 5 in accordance with one or more illustrative aspects discussed herein. FIG. 7 depicts an example of updated advertisement placement and size on the obscured webpage of FIG. 6 in accordance with one or more illustrative aspects discussed herein. FIG. 8 depicts an example of another obscuration of the webpage of FIG. 5 in accordance with one or more illustrative aspects discussed herein. FIG. 9 depicts an example of updated advertisement placement and size on the obscured webpage of FIG. 8 in accordance with one or more illustrative aspects discussed herein.

As shown in FIG. 5, a browser (e.g., a first window) 500 of the user device may include content of the webpage 501, one or more a blank space areas 502, and multiple advertisements 503. The user device may have received the data for rendering the webpage and the configuration data prior to displaying the webpage in the browser 500. The browser may include functionality of any browser known in the art. For example, the browser 500 may permit a user to scroll the webpage in a direction. Based on the received configuration data, the user device may monitor continuously or periodically for obscuration to one or more advertisements at the advertisement locations of the webpage. In this example, the user device may monitor a first advertisement 503*a*, a second advertisement 503*b*, and a third advertisement 503*c*.

As discussed above, FIG. 6 shows one example of an obscuration to the second and third advertisements 503*b* and 503*c*. In this example, an object (e.g., a second window) 600 of an application or browser is overlaid such that the advertisement 503*b* is not fully visible and the advertisement 503*c* is not at all visible to the viewer of the browser 500. In response to detecting such an obscuration of the second and third advertisements 503*b,c* the user device may determine webpage characteristics of the first window 500 and send the webpage characteristics in an obscuration report to the advertisement controller 122.

The advertisement controller 122 may perform one or more steps of FIGS. 3 and 4 and, as a result, may determine that the third advertisement 503*c* has a preference for the top left region of the webpage and has a higher priority level than the first advertisement 503*a* (see steps 430 and 435). The advertisement controller 122 may determine to remove the first advertisement 503*a* and put in its location the third advertisement 503c (see step 445). The advertisement controller 122 may also determine to resize the second advertisement 503b such that the second advertisement 503b will not be overlaid by the second window 600 (see step 445). Additionally, the advertisement controller 122 may determine that a smallest available version of the first advertisement 503 is greater the visible blank space area 502a and, thus, may determine not to resize and place the first advertisement 503a in the visible blank space area 502a (see step 410). Further, the advertisement controller 122 may determine that the priority level of the content 501 of the webpage is higher than the priority level of the first advertisement 503a and, as a result, may maintain the placement of the content 501 and may determine to not reinsert the first advertisement 503a (see step 425).

The advertisement controller 122 may then generate advertisement placement instructions based on the determinations and send the advertisement placement instructions and the resized advertisement to the user device (see step 355). The user device may then execute the instructions to remove the first advertisement 503a, move the third advertisement 503c into the location made available by the removal the first advertisement 503a, and resize the second advertisement 503b as shown in FIG. 7. As a result, the third advertisement 503c that was entirely obscured (overlaid) by the second window 600 is now fully visible by a viewer of the webpage. Additionally, the second advertisement 503b that was partially obscured (overlaid) by the second window 600 is now fully visible in its reduced size. The user device may then return to monitoring for obscurations of the advertisements 503.

As discussed above, FIG. 8 shows another example of an obscuration to the advertisements of the webpage. In this example, the first advertisement 503a is entirely obscured (not visible) and the second advertisement 503b is partially obscured (not visible) as a result of a viewer scrolling down on the webpage. The user device may determine webpage characteristics of the webpage and may send an obscuration report encapsulating the webpage characteristics to the advertisement controller 122.

The advertisement controller 122 may determine that the visible blank space area 502b (shown in FIG. 8) is sufficiently large to fit the second advertisement 503b (see step 410). The advertisement controller 122 may determine to move the second advertisement 503b to the visible blank space area 502b (see step 415). The advertisement controller 122 might not move the obscured first advertisement 503a if the first advertisement 503a has a lower priority level than that of second and third advertisements 503b,c (see steps 435 and 440). The advertisement controller 122 may generate and send instructions, to the user device, to move the second advertisement 503b to the visible blank space area 502b (see step 355). The user device may then execute the instructions to thereby move the second advertisement 503b to the location previously associated with the visible blank space area 502b as shown in FIG. 9. The user device may then return to monitoring for obscurations.

While the above has been described with respect to webpages, the system may be employed in other areas. For example, the system may also be used for picture-in-picture setups of a cable or service provider. In such cases, the user device may be a DVR, STB, or smart TV. Additionally, the advertisement controller 122 may identify which advertiser is providing a feed including the advertisement to the user device to determine which advertiser should receive the impression credit for the advertisement. For example, if a first advertiser is providing the feed for the background display and a second advertiser is providing the feed for the foreground display, the user device may indicate as such in its report sent to the advertisement controller 122. In response, the advertisement controller 122 may determine which advertiser to give impression credit for the advertisement based on whether the advertisement is in the background display or the foreground display.

As illustrated above, various aspects of the disclosure relate to providing responsive advertisement online. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
causing, by a computing device, display of a plurality of content items on a display device;
receiving, by the computing device, one or more scrolling commands that cause a first content item, of the plurality of content items, to be at least partially obscured on the display device; and
causing, by the computing device, output of an updated display on the display device,
wherein the updated display comprises the first content item in a different position on the display device, and
wherein the causing the output is based on;
an amount, of the first content item, that is obscured, satisfying a first threshold; and
a time duration, that the first content item was visible prior to being obscured, satisfying a second threshold.

2. The method of claim 1, wherein the causing output of the updated display comprises:
determining a second content item, of the plurality of content items, based on a comparison of a priority of the first content item and a priority of the second content item; and
repositioning the first content item for display at a location of the second content item.

3. The method of claim 1, wherein the causing output of the updated display comprises:
determining that the first content item has an obscured portion and a visible portion; and
based on a comparison of a size of the visible portion to a size preference for the first content item, resizing the first content item to fit within the size of the visible portion.

4. The method of claim 1, wherein the causing output of the updated display comprises:
resizing a second content item on the display device, based on a second size preference for the second content item; and
repositioning the second content item on the display device, based on a position preference of the second content item.

5. A method comprising:
causing, by a computing device, display of a plurality of content items on a display device;

receiving, by the computing device, one or more scrolling commands that cause a first content item, of the plurality of content items, to be at least partially obscured on the display device; and causing, by the computing device, output of an updated display on the display device, wherein the updated display comprises the first content item in a different size on the display device, and wherein the causing the output is based on:

an amount, of the first content item that is obscured, satisfying a first threshold; and a time duration, that the first content item was visible prior to being obscured, satisfying a second threshold.

6. The method of claim 5, wherein the causing output of the updated display comprises:

determining a plurality of potential visible blank space areas and a plurality of alternative content item sizes;

repositioning the first content item to a visible blank space area of the plurality of potential visible blank space areas; and resizing the first content item to an alternative content item size of the plurality of alternative content item sizes.

7. The method of claim 5, wherein the causing output of the updated display comprises: repositioning the first content item to a visible blank space area that is based on one or more of:

a size preference of the first content item; or a location preference of the first content item.

8. The method of claim 5, wherein the causing output of the updated display comprises repositioning the first content item to a visible blank space that is based on one or more of:

a width preference of the first content item;

a length preference of the first content item; or an area preference of the first content item.

9. A method comprising:

storing information indicating a plurality of types of obscuration, and for each type of obscuration, a corresponding command for addressing the obscuration;

causing, by a computing device, display of a plurality of content items on a display device;

receiving, by the computing device, one or more scrolling commands that cause a content item, of the plurality of content items, to be at least partially obscured, on the display device, by a first type of obscuration of the plurality of types of obscuration; and causing, by the computing device, output of an updated display on the display device-based on:

time duration, that-the content item was visible prior to being at least partially obscured, satisfying a threshold amount of time;

the first type of obscuration; and the stored information.

10. The method of claim 9, wherein the causing the output of the updated display is further based on a comparison of an amount of the content item that has been obscured to a second threshold.

11. The method of claim 9, wherein the information indicates different commands to be executed by different types of overlaying objects, wherein the causing the output is further based on an identification of an overlaying object that has at least partially obscured the content item.

12. The method of claim 9, wherein the information indicates:

the first command corresponding to obscuration by a user's scrolling command.

13. The method of claim 1, further comprising:

sending an obscuration report indicating a manner in which the first content item was obscured, wherein the obscuration report comprises one or more of:

information indicating an obscured area of the first content item;

information indicating a time that the first content item was obscured;

information indicating that the first content item was obscured due to a visual object or window being overlaid on top of the first content item; or information indicating that the first content item was obscured due to a scrolling command.

14. The method of claim 1, further comprising:

based on an amount of a second content item that has been obscured not satisfying the first threshold, continuing to display the second content item at a current position.

15. The method of claim 1, further comprises:

receiving, from a second computing device different from the computing device, information indicating the amount of the first content item that has been obscured.

16. The method of claim 9, wherein the information indicates that a content item is obscured by a user's command to scroll the content item in one of a plurality of directions, and wherein the causing the output of the updated display is further based on an identification that indicates a scrolling direction.

17. The method of claim 1, wherein the first threshold indicates a percentage of a spatial amount of a content item.

18. The method of claim 1, wherein the first content item is obscured by a second content item that is displayed on the display device.

* * * * *